(12) United States Patent
Derrah

(10) Patent No.: US 10,532,797 B2
(45) Date of Patent: Jan. 14, 2020

(54) RETRACTABLE DRIVE FOR A POWERED SURFBOARD

(76) Inventor: Steven John Derrah, Portsmouth, RI (US)

( * ) Notice: Subject to any disclaimer, the term of this patent is extended or adjusted under 35 U.S.C. 154(b) by 0 days.

(21) Appl. No.: 13/489,367

(22) Filed: Jun. 5, 2012

(65) Prior Publication Data

US 2013/0323989 A1    Dec. 5, 2013

(51) Int. Cl.
*B63H 21/17*     (2006.01)
*B63H 5/15*     (2006.01)
*B63B 35/79*     (2006.01)

(52) U.S. Cl.
CPC ...... *B63B 35/7943* (2013.01); *B63B 35/7926* (2013.01); *B63B 35/7933* (2013.01); *B63H 5/15* (2013.01); *B63H 21/17* (2013.01)

(58) Field of Classification Search
CPC . B63B 35/79; B63B 35/7943; B63B 35/7926; B63B 35/7933; B63H 5/08; B63H 5/125; B63H 5/15; B63H 5/20; B63H 21/17; B63H 2021/216; G06F 1/163; G06F 3/014

USPC ........................................ 440/38–47; 60/221
See application file for complete search history.

(56) References Cited

U.S. PATENT DOCUMENTS

| 5,199,913 A | * | 4/1993 | Toyohara et al. ................ 440/47 |
| 6,872,105 B2 | * | 3/2005 | Dusablon et al. ................ 440/1 |
| 9,718,521 B2 | * | 8/2017 | Derrah ................ B63B 35/7943 |

* cited by examiner

*Primary Examiner* — Ajay Vasudeva

(57) ABSTRACT

This application includes an electric powered surfboard equipped with drive units that emerge out onto the surfboard's bottom surface to power it forward. Once a wave is caught the drive units can retract back up into the surfboard's body as the power is shut off by the surfer. Then instantly, flush fitting glide doors close, allowing the surfboard's bottom to return to a planing surface with no protrusions, except for fins to detract from the surfboard's critical gliding ability when surfing waves. Also, there's a crowned deck shape that allows thin rail sensitivity for turning performance and a motor battery arrangement that provides mass centralization of weight. All this, combined with several wireless control means define this new fine handling motorized surfboard.

1 Claim, 17 Drawing Sheets

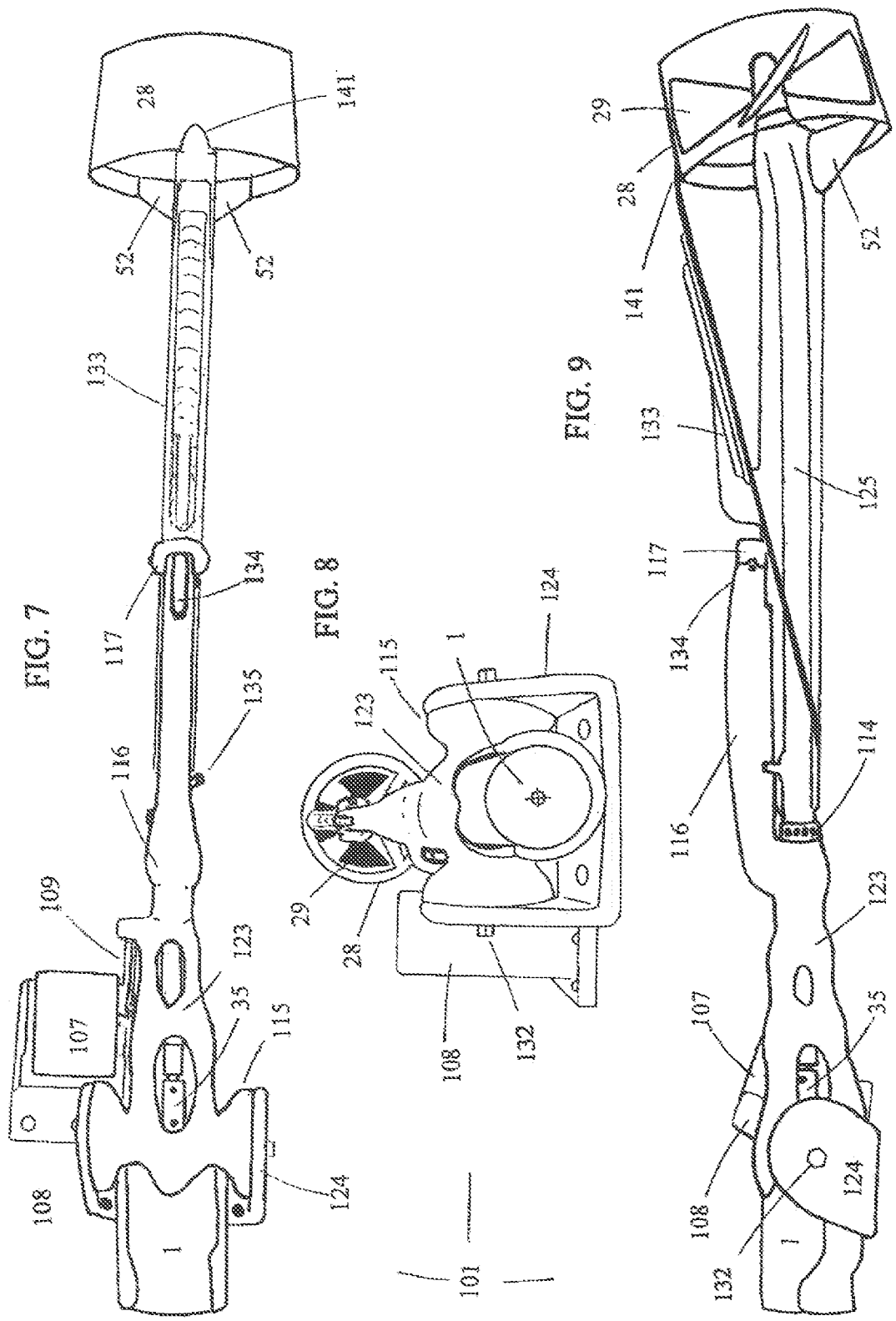

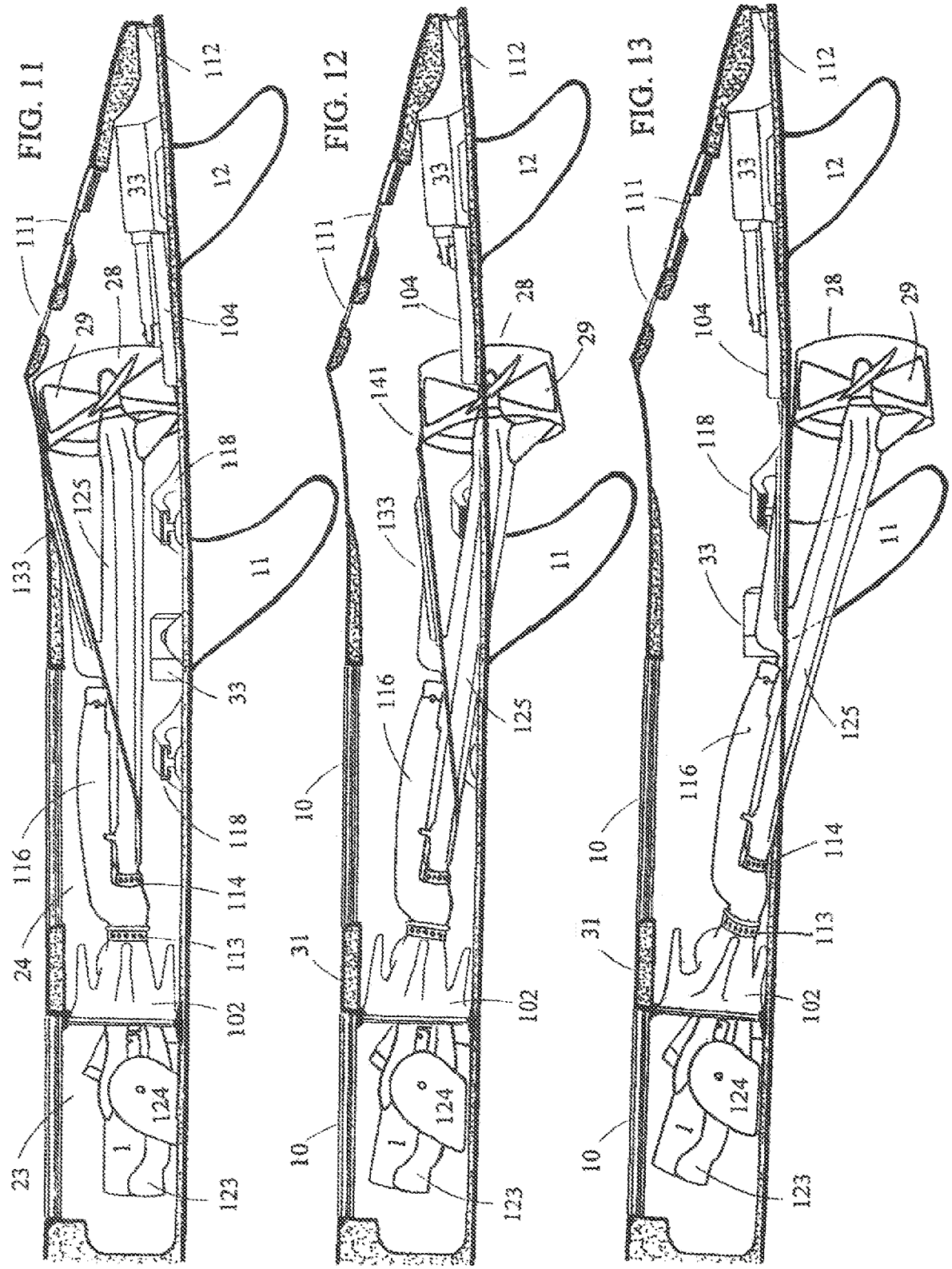

FIG. 23
FIG. 24
FIG. 25
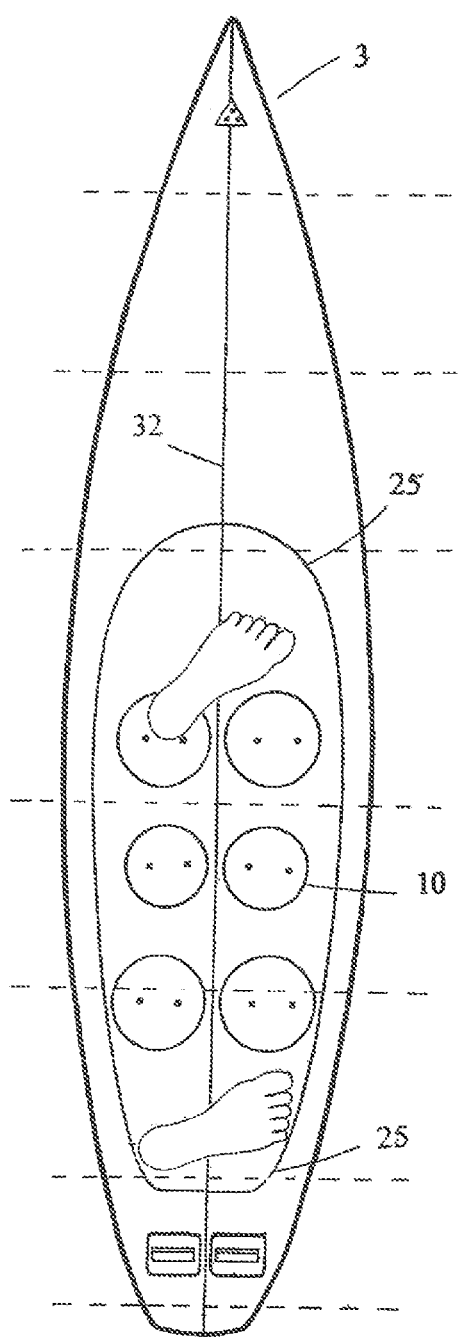
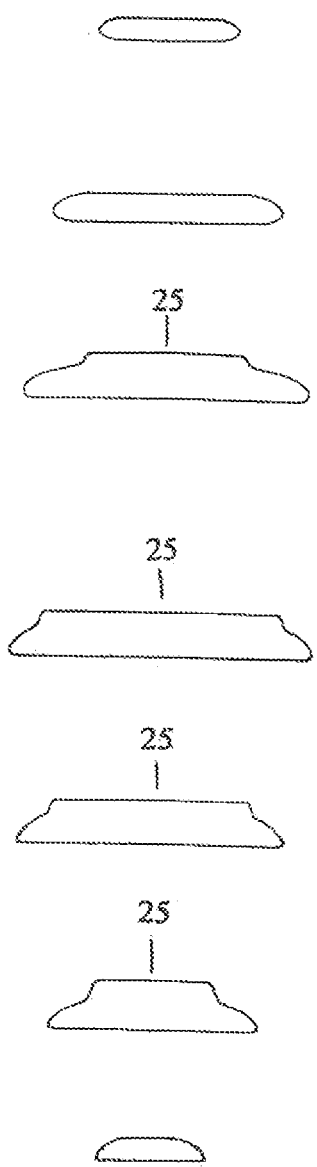
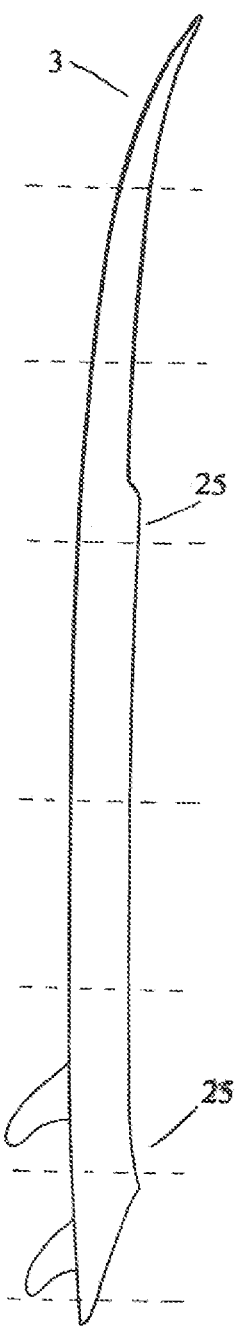

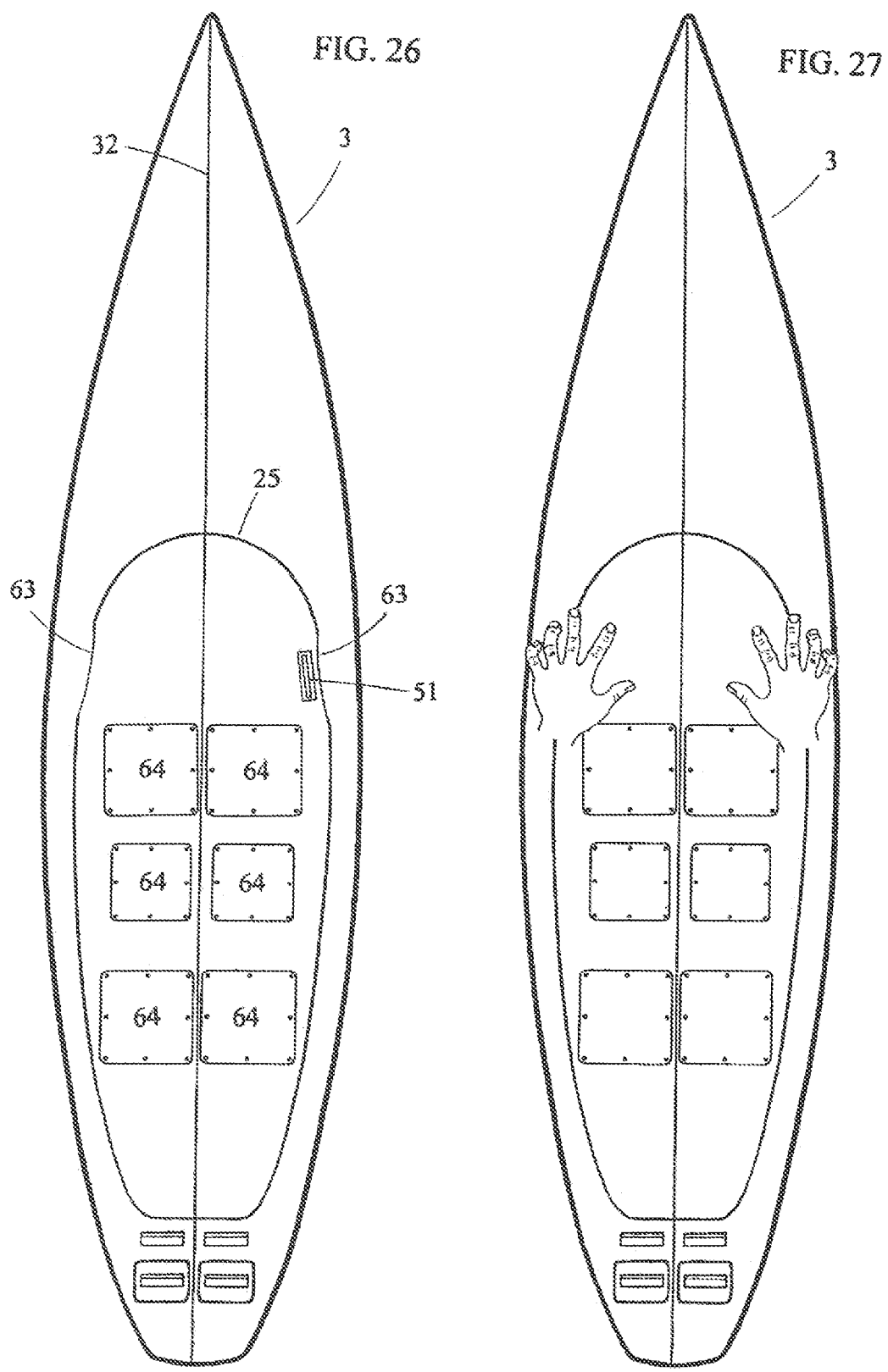

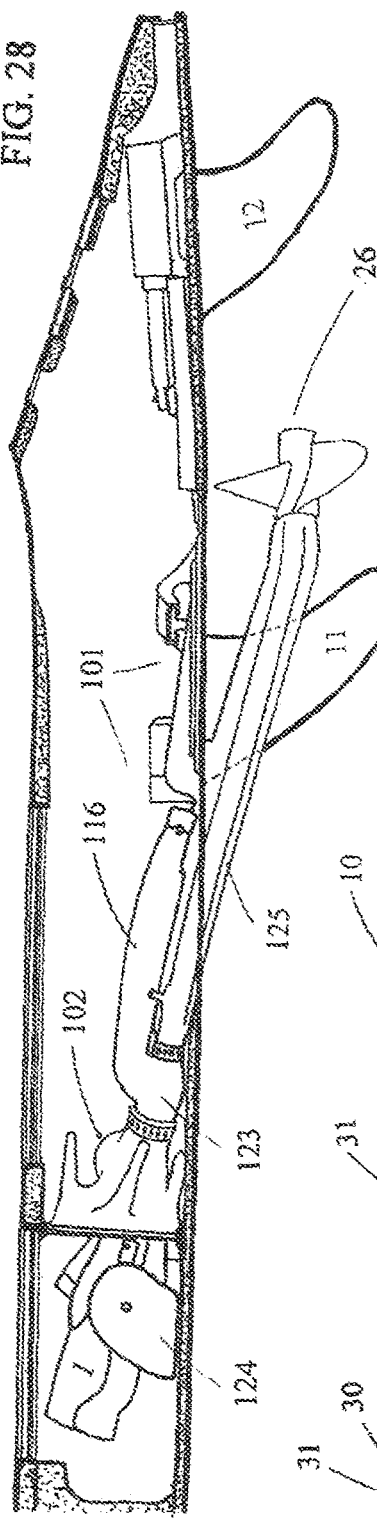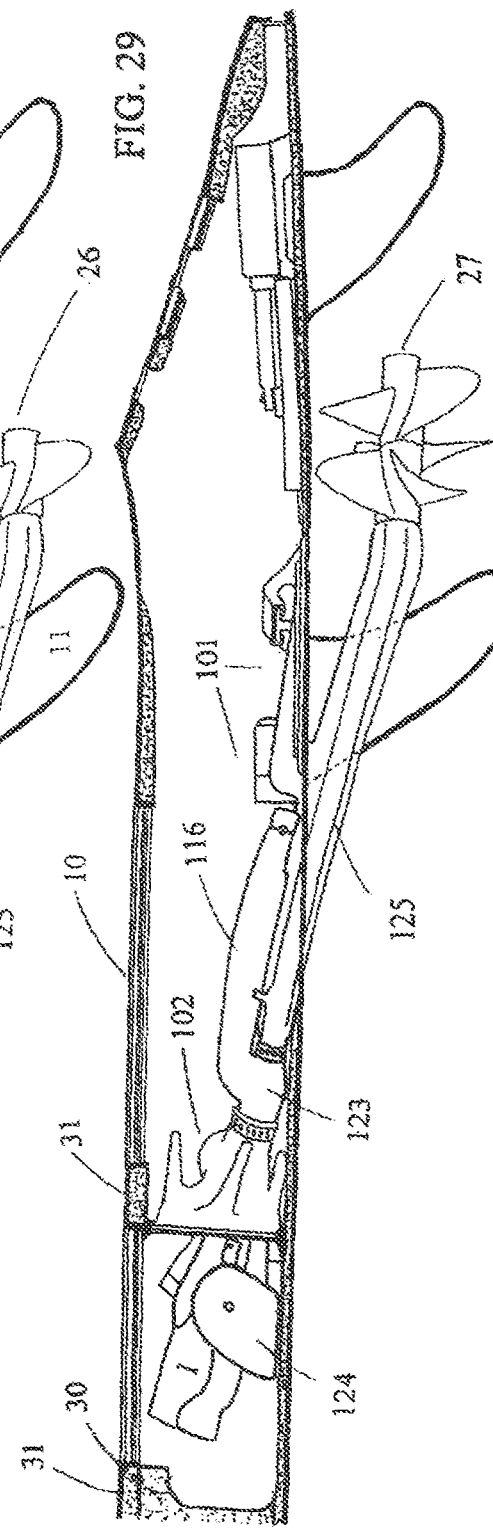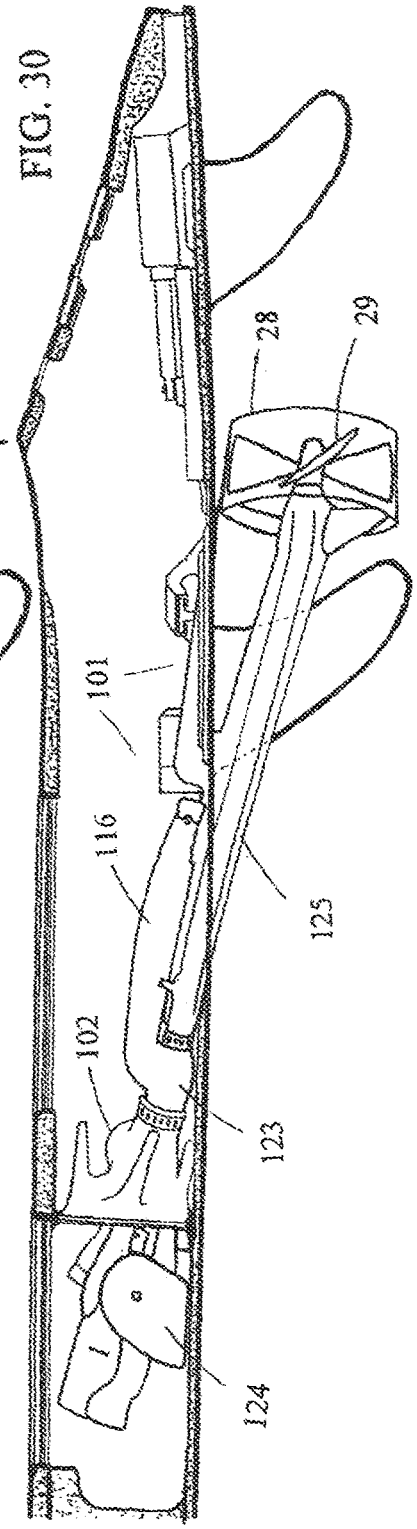

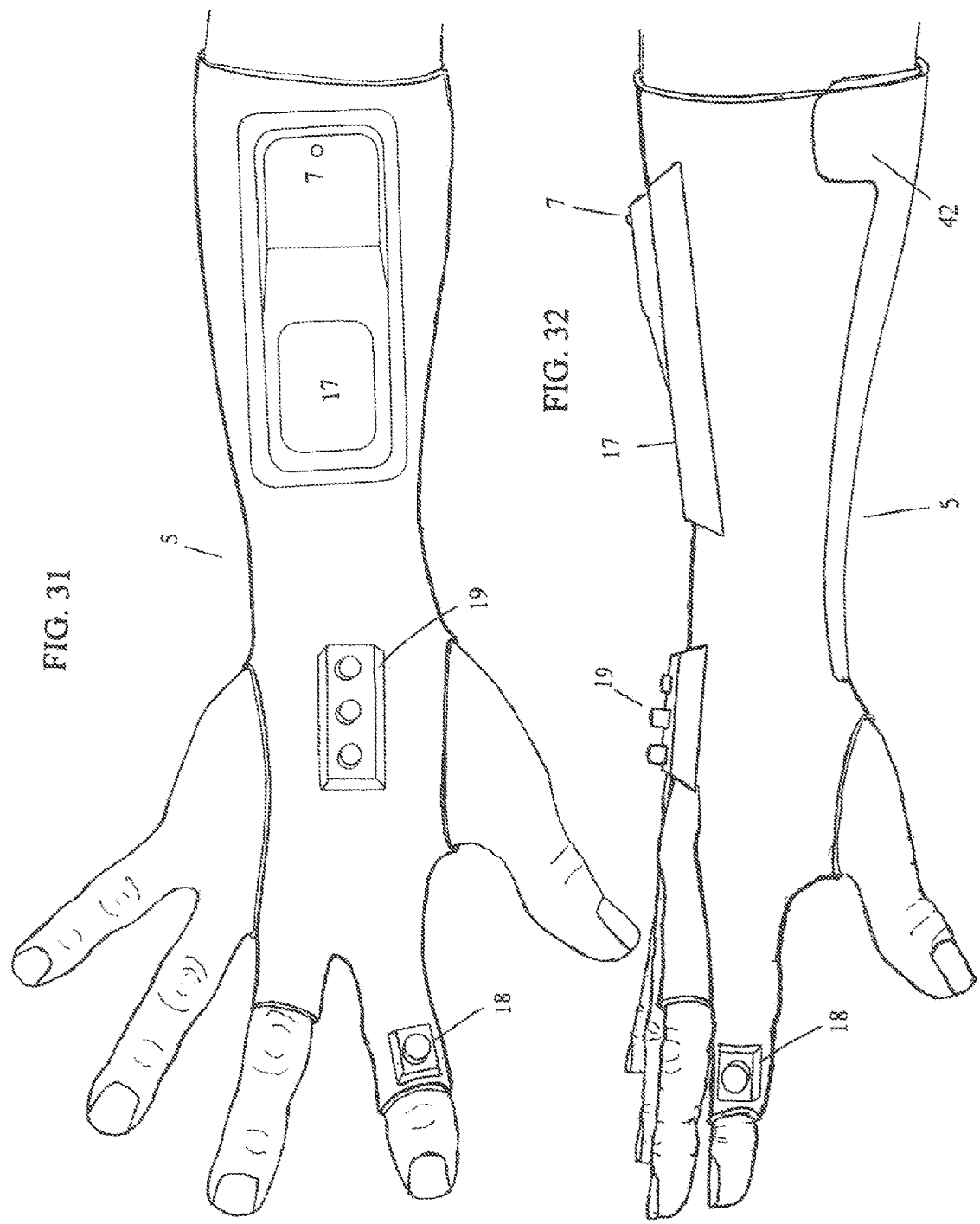

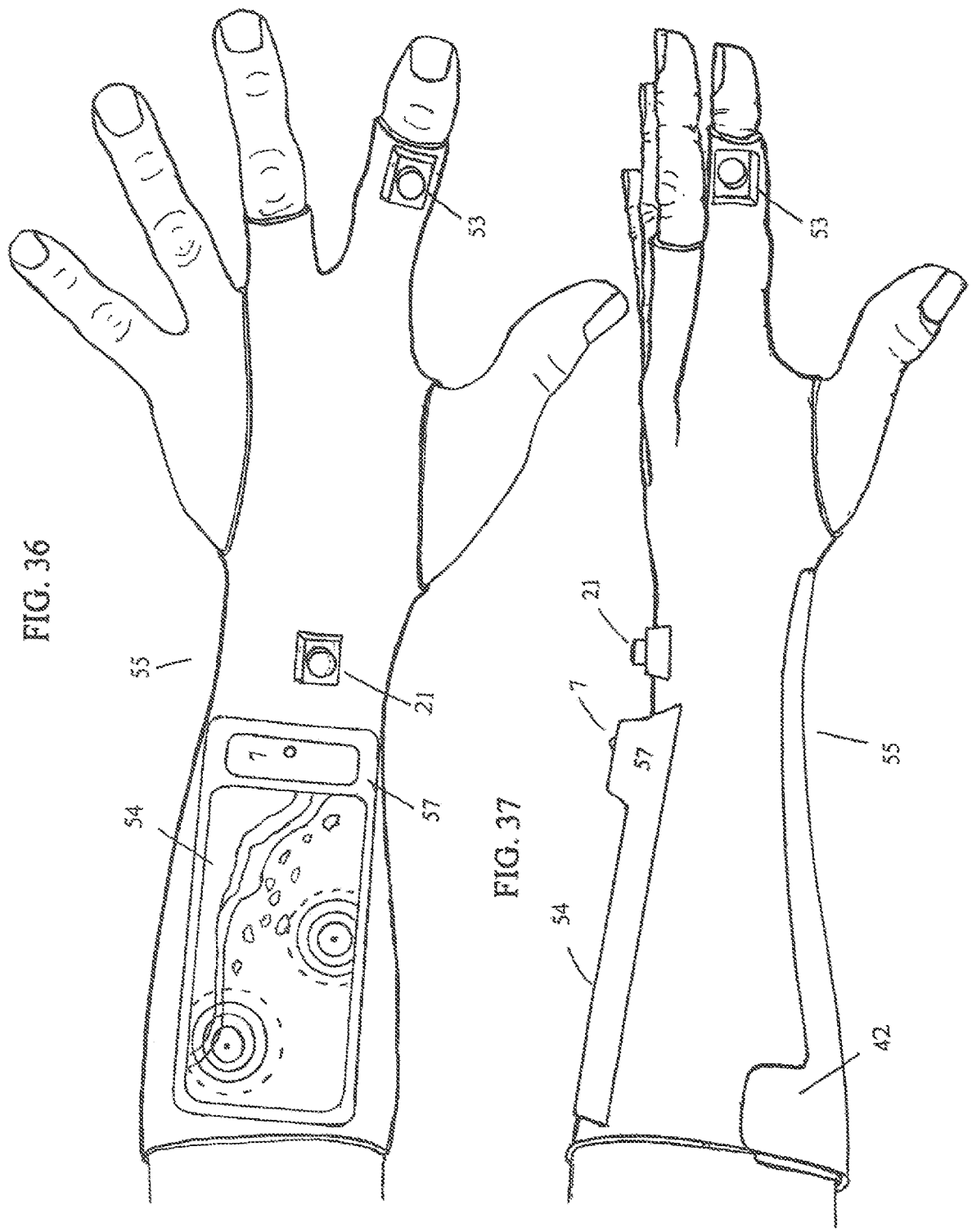

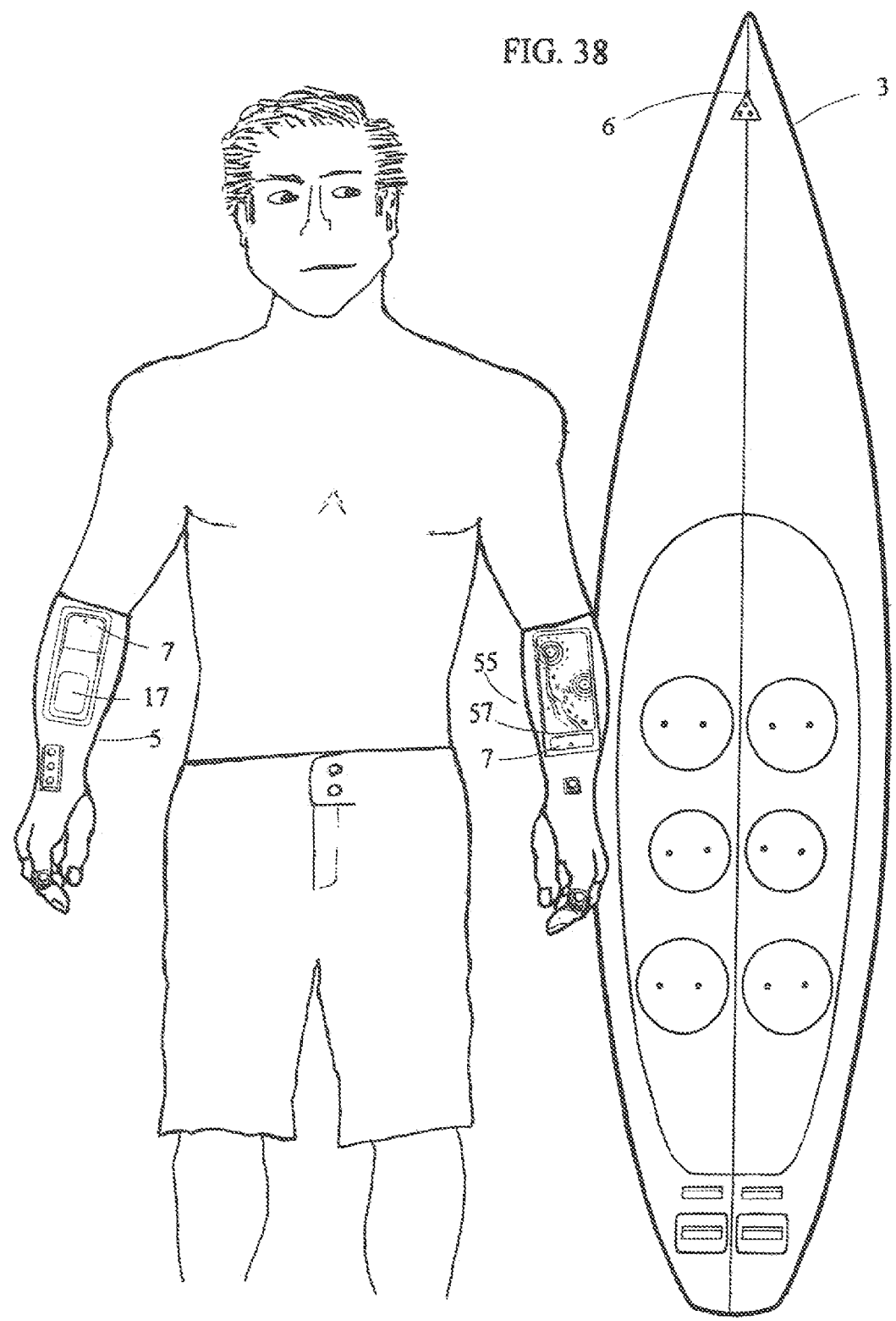

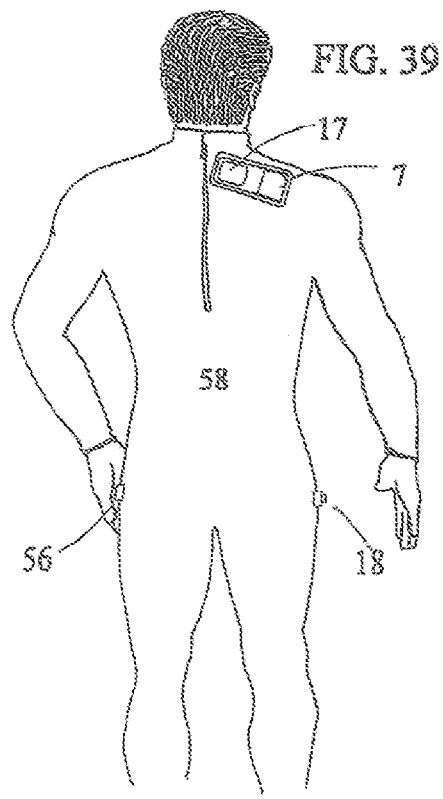
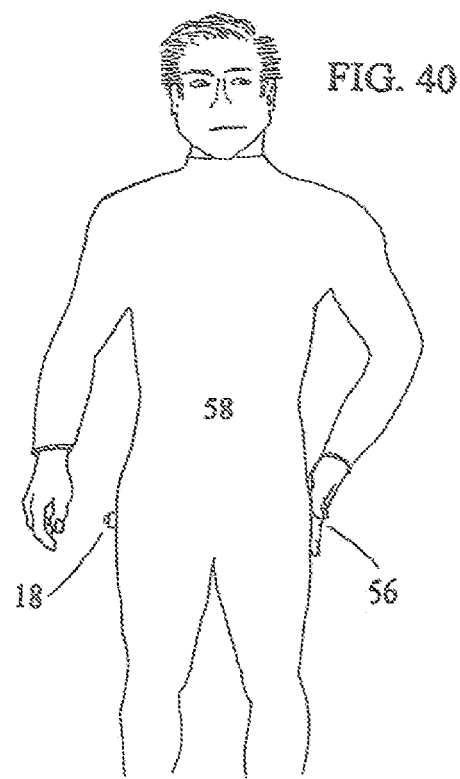
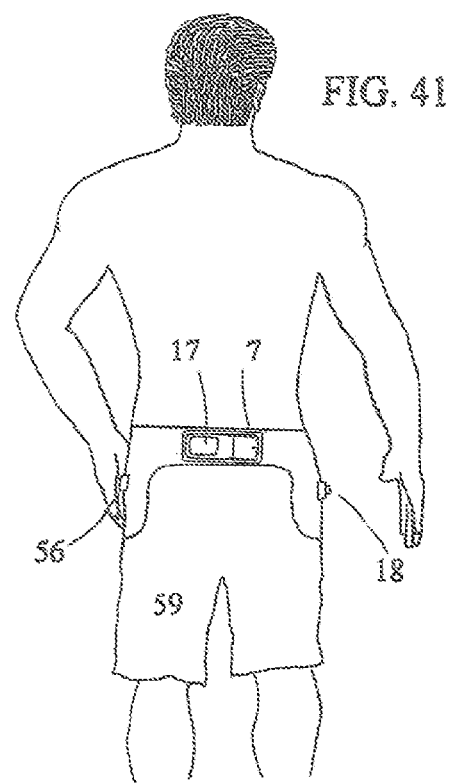
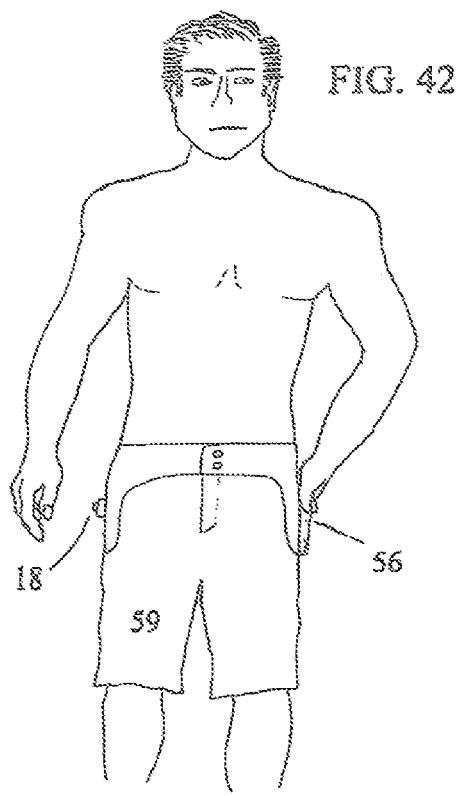

RETRACTABLE DRIVE FOR A POWERED SURFBOARD

BACKGROUND OF THE INVENTION

1. Field of the Invention

The present invention relates to electric powered surfboards.

2. Description of the Related Art

Electric powered surfboards for the purpose of providing paddling assistance have come on to the market in recent years that claim to be able to maintain traditional surfing performance. These are jet drives that surf waves with the power on which is not traditional surfing. If these jet drive boards were to surf waves with the power off the large jet tube intakes on the bottom surface of the surfboard will significantly restrict forward movement and thwart turning performance of any surfboard, especially short ones. These intake holes allow water to flow through them even when the power is off. Therefore this disruption of the planning hull makes the claim of "traditional surfing performance" impossible.

The present invention is different because it has retractable rigid drives instead of jet drives. The present invention is better because of the flush fitting glide doors that allow a motorized surfboard to glide like a traditional non-powered surfboard when riding a wave, with no disruption of the planning surface. The prior art referred to is Rott et al US2011/0201238A1 and Railey #1 US2011/0056423A1 and Railey #2 U.S. Pat. No. 7,731,555B2.

SUMMARY OF THE INVENTION

With this retractable surfboard surfers turn a historic corner to experience a new reality in modern surfing. Enabling not only prone paddling assistance, but also making it possible for a surfer to travel fast while standing up on a short board that would otherwise sink without a wave pushing it along. While standing, the surfer's overall height gives him increased visibility and the advantage to see sets of oncoming waves. Another advantage is the ability to quickly maneuver to a more desirable point of entry while standing, and power drive into a wave that is outside the pack of surfers sitting in the conventional take off area.

Once the rider feels the wave is carrying him forward it's time to push the power off button. This starts the sequence to stop the impeller, open the glide doors, retract the drive shaft unit and close the glide doors all within two seconds in sequential order.

Now that the board is gliding along motor off, like a conventional planning hull surfboard, the rider is able to drop in and surf the wave at will, doing all the moves an average surfer would normally perform on a short, high performance non powered surfboard.

This retractable surfboard can weigh up to two and a half times the weight of a conventional surfboard due to the motor, batteries and moving parts. These components are strategically placed between the surfer's front and rear foot and just aft of the widest point of the surfboard thereby centralizing the weight mass at the surfboard's balance point and contributing to the good handling characteristics.

The present invention's formula to combine centralization of weight mass with the thin rails provided by the crowned deck and the flush fitting glide doors, make the retractable surfboard the finest handling motorized surfboard ever developed, and the only one that really surfs. It is designed to surf waves with the motor and propellers off and neatly retracted into the surfboard's hull with no protruding parts or open cavities to interrupt the flow of water across the hull's planning surface.

BRIEF DESCRIPTION OF DRAWINGS

FIG. 7 is a top view of one embodiment of the retractable rigid drive system.

FIG. 8 is an end view of one embodiment of the retractable rigid drive system.

FIG. 9 is a side view of one embodiment of the retractable rigid drive system.

FIG. 11 is a cutaway side view of one embodiment of two cabins housing the retractable rigid drive seen in the UP position with glide doors shut.

FIG. 12 is a cutaway side view of one embodiment of two cabins housing the retractable rigid drive seen in the halfway position with glide doors open.

FIG. 13 is a cutaway side view of one embodiment of two cabins housing the retractable rigid drive in the Down position with the shaft glide door open and the prop glide door closed and the attached run door closed.

FIG. 23 is a top view of the twin retractable drive short surfboard 3 showing the foot placements as well as dotted cut lines indicating where the cutaway thickness profile samples seen in FIG. 24 are cut.

FIG. 24 shows seven cross-cut thickness profile samples taken from FIG. 23 displaying the unique crowned deck profiles.

FIG. 25 is a side view of the same twin retractable drive short surfboard 3 shown in FIG. 23. This shows a comparison to help understand where the cut lines are stationed to show the crowned deck 25 thickness samples in FIG. 24.

FIG. 26 is a top view of the retractable rigid drive short surfboard 3 version with hand landing grip areas 63 with an elongated manual on/off clicker button 51 as well as the contoured deck covers 64.

FIG. 27 shows the same top view of the retractable rigid drive short surfboard 3 as in FIG. 26 but with hands placed on the hand grip areas 63.

FIG. 28 shows a cutaway side view of the retractable rigid drive 101 in the down and run position with a three blade propeller 26 mounted.

FIG. 29 shows a cutaway side view of the retractable rigid drive 101 in the down and run position with twin, counter rotating props 27 mounted.

FIG. 30 shows a cutaway side view of the retractable rigid drive 101 in the down and run position with the cort nozzle 28 and impeller 29 mounted.

FIG. 31 shows a top view of one embodiment of a wireless control glove 5.

FIG. 32 shows a side view of the same wireless control glove 5 shown in FIG. 31.

FIG. 36 shows a top view of one embodiment of a surfboard recovery glove 55.

FIG. 37 shows a side view of the surfboard recovery glove 55 shown in FIG. 36.

FIG. 38 shows a front view of the complete modern wireless motorized surfer wearing the control glove 5 and the recovery glove 55. Just behind him is the electric motorized retractable rigid drive surfboard 3.

FIG. 39 shows a back view of one embodiment of a hip control wetsuit 58 with two clicker buttons 6, 18 and a back mounted transmitter 7 battery pack 17.

FIG. 40 shows a front view of the same hip control wetsuit 58 shown in FIG. 39.

FIG. 41 shows a back view of one embodiment of a pair of hip control board shorts 59 with two clicker buttons 56, 18 and a back mounted transmitter 7 and battery pack 17.

FIG. 42 shows a front view of the same wireless hip control boardshorts 59 shown in FIG. 41.

DETAILED DRAWING DESCRIPTIONS

Figure 1:
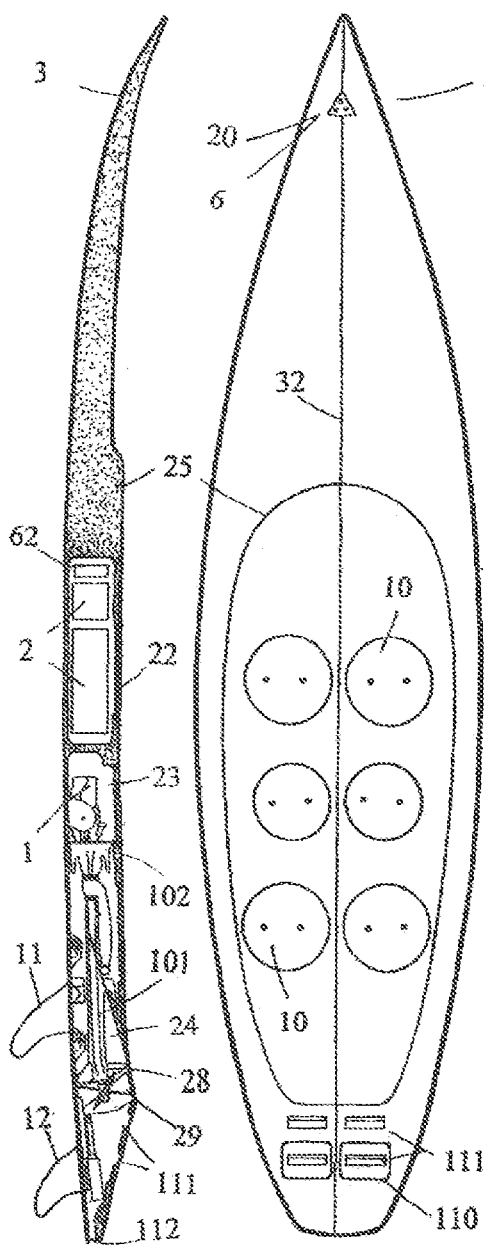
FIG. 1 is a cutaway side view of a crowned deck showing the interior portions of one embodiment of the present invention's retractable rigid drive motorized surfboard.

FIG. 1 shows a cutaway side view of one embodiment of the single stringer, twin foam and fiberglass epoxy modern short surfboard 3 with a retractable rigid drive 101 in the closed position. This view reveals a dry battery cabin 22 with two replaceable battery packs 2 and one control box 62 inside it. Next to it is another dry cabin 23 housing the motor 1 in its pivotal motor mount 123. The cabin 23 can remain dry because of the special flexible rubber wall 102. Aft of this is the drive cabin 24, a wet cabin that drains itself dry once the board is moving forward via the three aft water vents 111, 112. The cort nozzle 28 and impeller 29 are seen in the up position attached to the rigid drive case 125, 101, a side fin 11 and the tail fin 12.

Figure 2:
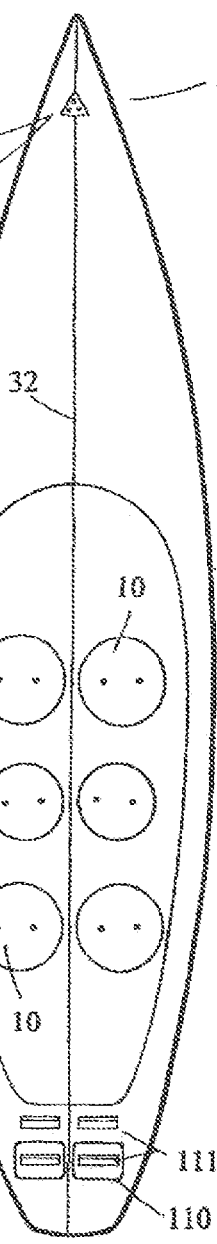
FIG. 2 is a top view of one embodiment of the retractable rigid drive motorized surfboard as it would appear in use.

FIG. 2 shows a top view of one embodiment of the single stringer, twin foam, fiberglass epoxy modern short surfboard 3 with retractable rigid drives 101 (not shown) that is roughly 6'6" in length.

The hardwood stringer 32 is seen running longitudinally at the surfboard 3 center. The crowned deck 25 outer perimeter can be seen providing a level yet heightened deck surface, also seen in FIG. 1 as a side view. This surface has six access covers 10, four large and two small. These covers are waterproof and strong enough to withstand a human's full weight stomping on them. They also should fit perfectly flush with the deck surface of a finished board when screwed all the way down to contact the O-ring water proofing gaskets that are attached to the threaded cover frames. All six cover frames would preferably be installed or molded into the MBD case deck 36. They should also be as low profile as possible so they don't take up too much interior cabin space. The access covers have two small diameter holes in each to provide a way to unscrew them with a special pronged handle. The special handle and small holes are necessary to prevent the surfer's feet from stubbing or tripping on large hand grip welts like the store bought yacht industry hatches have.

Also shown are four drive cabin water vents 111 along with two aft access hatches 110 that are pressure clipped to a frame mounted gasket and contain a one way water vent 111. These water vents 111,112 allow the release of excess water and feature a one way flow allowing water to exit the drive cabin 24 but not enter. The four water vents 111 and the two bilge vents 112 all have spring loaded gasket flaps that provide light pressure to close them, so that they can open fully by higher pressure water that has to exit during drive changes that usually happen when the board is moving.

The combination battery gauge 20 and receiving antenna 6 are seen at the surfboard's 3 nose. A preferred construction would be a thin profile, triangle shaped, flush fitting, water proofed wafer that houses the LED lights that indicate battery charge levels as well as the receiver's antenna end.

Figure 3:
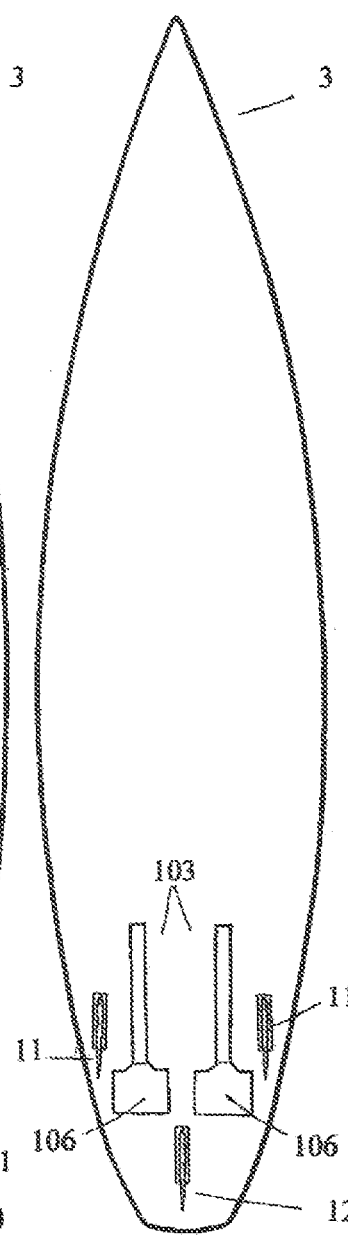
FIG. 3 is a bottom view of one embodiment of the retractable rigid drive motorized surfboard with all glide doors shut as it would appear while surfing a wave.

FIG. 3 shows a bottom view of one embodiment of a modern short surfboard 3 version of the present invention retractable drive motorized surfboard, showing two side fins 11 and one tail fin 12 with low profile square fin boxes 13 holding them upright and allowing an interchangeable feature. Also shown are the outline edges of the shaft glide doors 103 in the shut position along with the prop glide and run doors 106 also in the shut position. These flush fitting, opening and closing glide doors make it possible to surf waves like a conventional surfer with no protrusions or intrusions on the bottom surface to interrupt water flow and thwart wave handling.

Figure 4:
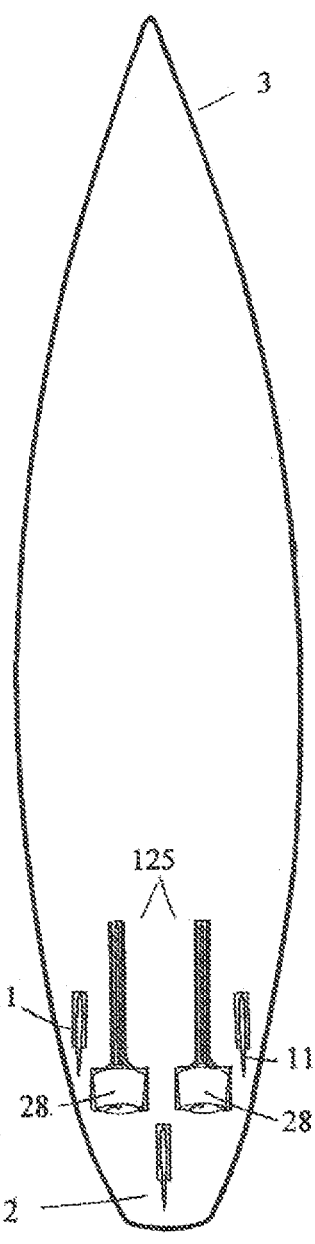
FIG. 4 is a bottom view of one embodiment of the retractable rigid drive motorized surfboard with all glide doors open and the rigid drive shaft with the nozzle and impeller seen outside the bottom surface in the run position as it would appear in use under power.

FIG. 4 shows another bottom view of one embodiment of a modern short surfboard 3 version of the present invention showing the rigid shaft tube and case 125 along with the cort nozzles 28 outside the board in the run position. The cort nozzles 28 provide prop wash sorting with a thrust increase as well as injury protection. This safety feature alone makes the cort nozzle the preferred design for mass market production.

Figure 5:
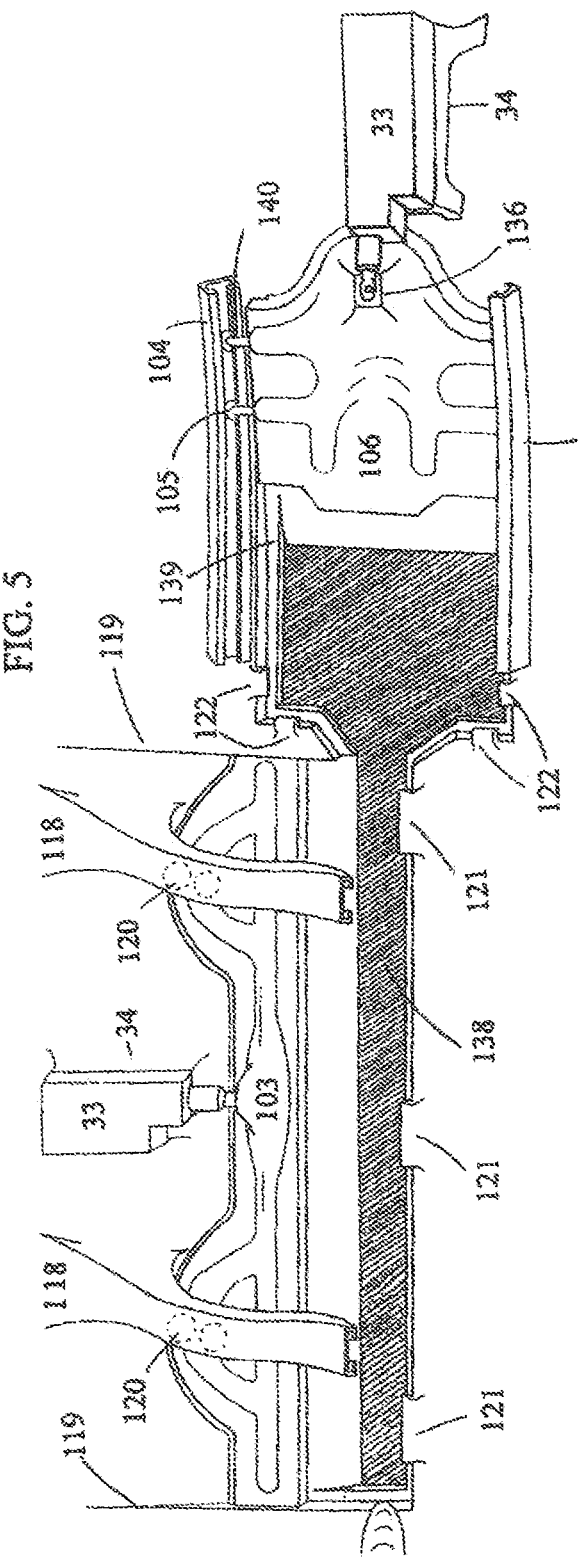
FIG. 5 is a top view of the two glide doors and the opening that allows the rigid drive to travel through. This shows all the operating components retracted to open the glide doors.

FIG. 5 is a top view of one embodiment of a dual glide door system seen here with both glide doors 103,106 in the open position. This advantageous embodiment allows a motorized surfboard to glide obstruction free when the power is off and riding the wave. The glide doors 103,106 are based around a "T" shaped opening 138 that allows the rigid drive shaft case 125 and cort nozzle 28 to clear the case base 37 on its way out to power the surfboard 3 forward. The opening 138 has shaped sides with creased edges like tiny stair steps on one side then a trough like ramp on the other. These shapes that are molded into the case base 37 help guide and seat the glide doors in conjunction with the shaft door stops 121 and the prop door stops 122.

The shaft glide door 103 is long and narrow with two half circle lobes that allow off-center attachment to the overhead guide tracks 118 via the overhead track rollers 120. These overhead guide tracks 118 hover over the shaft glide door 103 guiding the door 103 through the full stroke when closing and opening. They also provide back support to firmly hold the door down when in the shut position.

At least one piston type quick action electronic, waterproofed actuator 33 is seen in the retracted position holding the shaft glide door open. The actuator 33 signal comes from the micro circuit controller 16 (not shown) inside the control box 62 (FIG. 1) which gets its signal from the power on-off button.

The prop glide door 106 is used for gliding as well as running as it is programmed in sequence to first open and let the rigid shaft case 125 and cort nozzle 28 pass through the case base opening 138 to the outside of the surfboard's 3 bottom surface to power forward, then close for surfing.

FIG. 5 also shows the prop door 106 in the open position and 106 is seen as basically flat and square but having a delta shaped front with a flat spot to butt up against the shaft glide door 103 as well as the tiny stair steps molded into the rigid drive opening. The door's 103 aft end has a half circle lobe shape that extends out to connect with the actuator's 33 piston end via the connector pin 136 which is backed up by a structure grid that adds rigidity. The bottom of the prop glide door 103 is smooth for water flow (not shown). The prop door 106 edges have tiny stair step shapes to match up in reverse to the drive opening's 138 tiny stair steps and the slide in trough 139. The tiny stair step shape provides a sunken ledge on the drive opening 138 for the glide doors 103,106 to press down against when closed to maintain a virtually seamless fit that is 98% waterproof without gaskets. With the addition of neoprene pressure gaskets they could be 100% waterproof.

Figure 6:
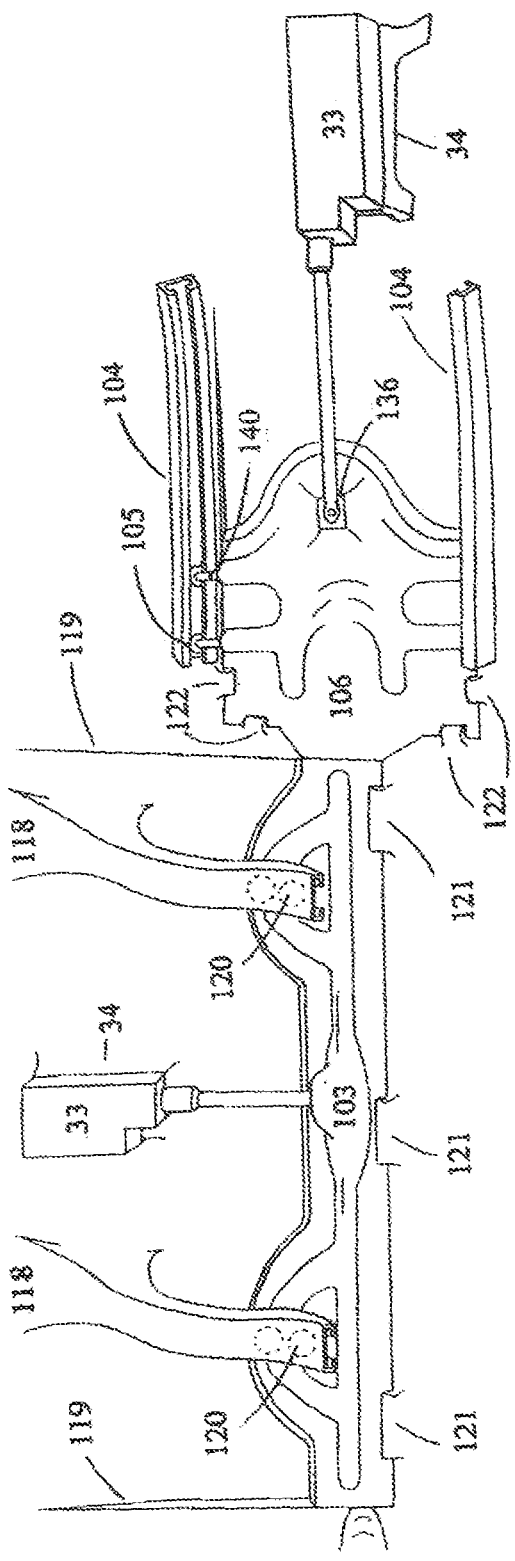
FIG. 6 is a top view of the two glide doors shut showing the operating components extended to close the glide doors for surfing waves.

FIG. 6 is a top view of one embodiment of a dual glide door system with both glide doors 103,106 in the closed position. In this position the shaft case 125 with the nozzle 28 and impeller 29 (not shown) would be up with the power off. The quick action actuator 33 is seen fully extended having pushed the shaft glide door 103 down the shaped trough 119 into its closed position. It's held in by the door stops 121 and held down by the overhead shaft door tracks 118 that move with base via the overhead track rollers 120.

The prop door 106 is seen in the closed position showing the actuator 33 in the extended position revealing the left and right door tracks 104 that are channel shaped to allow the prop door rollers 105 connected by the roller axles 140 to roll back and forth precisely and smoothly. The prop door 106 and the shaft glide door 103 are programmed to move simultaneously on the closing "up" stroke, but only the prop glide door will move on the opening "down" stroke after it lets the cort nozzle 28 and impeller 29 pass by on its way outside the board. The shaft glide door doesn't reclose because the shaft part of the rigid drive opening 138 is filled on the down stroke by the run door 133 (not shown).

FIG. 7 is a top view of one embodiment of a retractable rigid drive train 101. This retractable marine drive moves downward to power the surfboard 3 forward, then moves upward into the body of the surfboard 3 as the propeller 26 and impeller 29 plus cort nozzle 28 stops spinning and the glide doors 103,106 (not shown) close instantly. FIG. 7 shows a brushless motor 1 with an inline gear set cradled in the pivotal motor mount 123 which has a pivotal stand 124 that is fastened to the case base 37 featuring semicircular ears that match up to the pivotal mount's 123 alignment ears 115 that are pivot bolted 132 allowing both flat smooth faces to axis spin flush up against each other providing precision up and down movement without any side to side movement. This area moves into a semi cone shape that is hollow with 8 holes providing rigidity and reducing weight. It also allows service access to the motor coupler 35. At the end of the cone shape the motor mount body 123 extends out to the neck area where the rubber wall 102 (not shown in FIG. 7) is clamped which is right next to an appendage that connects to the servo arm 109 that is powered by the hi-torque servo 107. The drive train extends out further to embody the shaft hanger 116 that attaches to the shaft case plate 134.

The preferred material on these parts would be a high atmosphere manufactured carbon fiber for the highest strength to weigh ratio possible. FIG. 7 shows a top view of the run door 133 that fills the shaft opening 138. When under power it also doubles as a third attachment to the cort nozzle 28 as a nozzle clasp 141 that works in combination with the two struts 52 that protrude out from the shaft tube case 128 (not shown in FIG. 7) and connects to the inside of the cort nozzle 28. The nozzle clasp 141 and the nozzle struts 52 are designed to be thin and foiled to allow maximum flow and minimal obstruction yet be strong enough to hold the cort nozzle 28 in place under heavy loads.

FIG. 7 also shows a top view of the hi-torque servo 107, its stand 108 and the servo arm 109 that connects to the pivotal motor mount body 123 at the appendage protruding out the side of the motor mount 123. This servo 107 does not need to be waterproof because it is placed behind a flexible rubber wall 102 (not shown in FIG. 7) creating a dry cabin 23 for the motor 1 and servo 107.

FIG. 8 is an end view of the rigid drive 101. The pivotal mount stand 124 is seen holding up and pushing against the pivotal motor mount's alignment ears 115. The tightly engineered fit between the mount stand 124 and the mount's ears 115 keep the rigid drive from exhibiting any side to side movement as it precisely moves down and up to provide power or to shut off and glide. This type of alignment requires that the motor mount stand 124 be extremely rigid and sturdy and light as possible. To achieve this the part 124 also should be made of a high atmosphere carbon fiber. The motor 1 is seen fitting snugly into the pivotal motor mount body 123 extending down to the cort nozzle 28 and the impeller 29. The back of the servo stand 108 is seen close to the mount stand 124 which are both fastened to the MBD case base 37.

FIG. 9 is a side view of the retractable rigid drive 101. The pivotal mount stand 124 is seen showing its wide circular shape providing the large diameter face necessary to flush fit up against the pivotal alignment ears 115 which are part of the motor mount body 123. This is at least one embodiment to eliminate side to side movement.

The motor cradle, cone shaped, eight holed pivotal motor mount body 123 that tightly surrounds the drum shaped brushless electric motor 1 and inline gear set is seen in this side view. This body 123 is the beginning of the Three Point shaft tube and case 125 support structure.

Point One connects the shaft and tube case 125 at the motor 1 by the coupler 35.

Point Two connects the shaft case 125 at the end of the cone shaped motor mount body 123 by the shaft clamp 114.

Point Three connects the shaft case 125 at the end of the shaft hanger 116 at the hanger plate 134. The end cap 117 is seen clamping the forked hanger 116 end together. This Three Point structure makes it possible to hold the full length of the motor 1, motor body 123 and hanger 116 that holds up the shaft tube case 125, cort nozzle 28 and impeller 29 inline so that there's no flex from end to end. This unique design allows the motor 1 to ride on a type of see saw along with these five aforementioned integrated parts in complete unison on the motor mount stand's 124 two axis bolts 132 preventing any deflection occurring between the motor 1 and the drive shaft at the motor coupler 35 or down the other end of the shaft at the impeller 29 junction. This provides a 100% true spinning shaft 126 (not shown in FIG. 9) with zero vibrations to accommodate the high rpm's called for to aggressively power the surfboard forward with the preferred high K.V.H. multi pole brushless motor 1. Because of the restricted size of the surfboard body, large propellers spinning at lower rpm's are not an option. High rpm, small propellers or impellers in the 80 mm to 110 mm diameter range are the most functional. And different prop pitches to match each motors RPM range should be taken into account.

Figure 10:
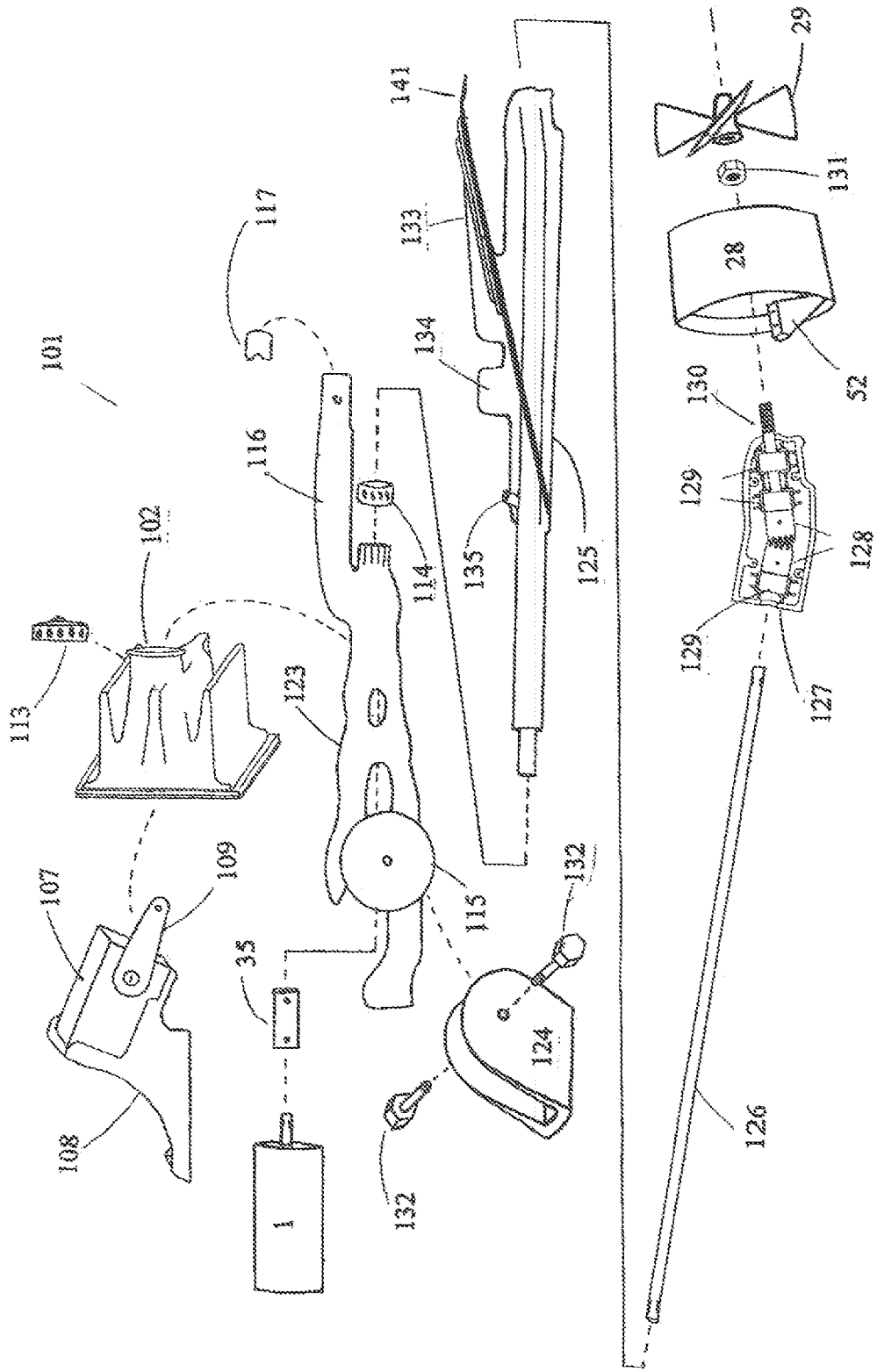
FIG. 10 is an exploded parts view of one embodiment of the retractable rigid drive system.

FIG. 10 is an extended parts view of one embodiment of the retractable rigid drive train of components. The brushless motor 1 and inline gear set is seen with its shaft next to the motor coupler 35. A side view of the pivotal motor mount body 123 is seen with its disc like alignment ears 115 and the shaft case hanger 116. The rubber wall 102 is seen unattached with a dotted line showing where it does attach to the neck at the end of the cone shaped body 123 and is fastened by the rubber wall clamp 113. The hi-torque servo 107 is seen in its unique stand 108. The servo 107 connects to the opposite side of the motor body 123 (not shown) and tucks into a pocket behind the rubber wall 102 that allows space for the servo arm 109 to move the rigid drive train 101 up and down. The motor mount stand 124 is seen with a dotted line showing that it attaches to the alignment ears 115. Its two axis bolts are shown with respective center holes. The hanger end cap 117 is seen with a dotted line showing where it attaches to the end of the forked hanger 116. The shaft clamp 114 is shown next to the spliced collar that it goes around to clamp the shaft tube case 125 to the motor mount body 123. The shaft tube case 125 is seen in a side view showing its tube like shape that fits into the motor mount body 123 and its gusseted fore body that has a turned up kink at the impeller 29 end. The angled end is necessary to aim the prop wash out the surfboard's transom at the correct angle which is more or less parallel to the surfboard's running surface. The hanger plate 134 is seen near the top of the shaft case 125 which is the support that holds up the run door 133 which attaches to the top of the cort nozzle 28 via the nozzle clasp 141. The metal shaft tube is seen at the motor end of the shaft case 125. It carries a bearing 129 (not shown) in it just where the shaft case gets larger in diameter. The grease nipple 135 is seen protruding out of the shaft case. It allows grease to be injected into the shaft tube which serves as a stuffing box that is stuffed with grease to prevent water from entering the motor cabin 23 and also to lubricate the bearings 129 as well as the shaft 126. The hardened steel drive shaft 126 is shown with notched ends to attach to the motor coupler 35 at one end and the drive gear 128 at the other end. The drive gear 128 is mounted in the angled end gear box half case 127. This gear box case 127 is detachable from the starboard side of the shaft tube case 125 and contains the gears 128, bearings 129, and the secondary shaft 130. This half case 127 makes it possible to re-direct the shaft angle as well as provide a gear box that can accommodate two different size gears 128 as well as provide ball bearing cases for the shafts 126, 130 to spin freely.

The cort nozzle 28 is seen with its nozzle struts 52 that are actually one piece and attach to the notch in the underside of the angled end gear box 127. The prop nut 131 and four blade impeller 29 attach to the secondary shaft 130. The cort nozzle 28 with impeller 29 setup provides prop wash sorting and extra thrust as well as protection from propeller injury.

FIG. 11 is a cutaway side view of one embodiment of two cabins 23, 24 housing the disappearing rigid drive 101 seen here in the up position with glide doors 103, 106 shut. The motor 1 is shown cradled in the pivotal motor mount body 123 hinged on the motor mount stand 124 more or less parallel to the top and bottom of the surfboard 3.

The forefront of the motor mount body 123 is tucked into the rubber wall 102. This flexible rubber wall separates the motor cabin 23 from the drive cabin 24 keeping the motor 1 and servo 107 dry. The rubber wall 102 has a square shaped frame made of hard plastic that butts up to the 4 sides of the two cabins inside. The plastic frame is glued to the rubber wall 102 and sealed on all four sides of the interior of the MBD case. The rubber wall is pleated to help the flexibility needed to follow the up and down movement of the motor mount body 123 without stressing waterproof glued edges. A bulbous pouch is shaped into the wall 102 on one side to make space for the hi-torque servo 107 (not shown in FIG. 11) and its arm 109 (not shown in FIG. 11) where it attaches to the motor mount's 123 appendage (not shown in FIG. 11). The rubber wall 102 is hose clamped 113 to the motor mount body 123 just where the case hanger 116 starts, therefore sealing off the motor cabin 23 from the wet drive cabin 24. A smaller diameter hose clamp 114 is seen holding the shaft tube case 125 as well as waterproofing the junction between motor mount body 123 and the shaft case 125.

The shaft tube case 125 is shown being held up by the arch backed hanger 116 which is an extension of the motor mount body 123. The run door 133 is an appendage crossing the shaft case 125 and extending out to attach to the top of the cort nozzle 28 by way of a detachable clasp 141. They are seen jammed up to the ceiling of the drive cabin 24 at its thickest point that doubles as a kick tailed standing surface to help secure the rider's rear foot. The four blade impeller 29 is seen inside the cort nozzle 28. The three one way water vents 111, 112 are shown aft of the cort nozzle 28 poised to take on temporary high water pressure from the next drive change. The actuator 33 is shown fully extended indicating that the prop glide door 106 (not shown in FIG. 11) is closed. The power should be off with the impeller stopped. The overhead glide door tracks 118 channel shaped ends are seen with the track rollers 120 (not shown in FIG. 11) peering out at the end of their stroke indicating that the shaft glide door 103 (not shown in FIG. 11) is closed.

FIG. 12 shows a cutaway side view of one embodiment of two cabins 23, 24 housing the retractable rigid drive 101 seen here in mid-stroke with both glide doors 103, 106 not shown) open. The run door 133 and nozzle clasp 141 are seen away from the cabin 24 ceiling. The actuator 33 is seen fully retracted to remove the prop glide door 106 (not shown) from blocking the path of the downward moving cort nozzle 28. At this mid-stroke is preferably when the power should switch on to start the impellers 29 spinning on the way out. Also at the mid-stroke of the rigid drive 101 shown in FIG. 12 is when the water rushes into the drive cabin 24 causing the one way flaps on the three water vents 111, 112 to open and release a temporary influx of water weight. The water rushes into the cabin 24 at a much higher rate when the rigid drive 101 is at mid-stroke on the way up into the body of the surfboard's 3 cabin 24 when the power's been turned off and the surfboard 3 is at full speed with a wave pushing it along. It is at this moment when it is of the utmost importance that the closing sequence happens as quickly as possible because of the hesitation of forward movement caused by the transition between power-on and gliding. At this moment when the rider is catching a wave, dropping down its face, hesitation is not welcomed. Therefore the closing sequence has to happen instantly. This is made possible with the use of the quick action actuators 33 closing the glide doors 103, 106 and the hi-speed servo 107 programmed correctly.

FIG. 13 shows a cutaway side view of one embodiment of two cabins 23, 24 housing the retractable rigid drive 101 seen here at the bottom of the down stroke, power on. The electric quick action actuator 33 is seen fully extended indicating that the prop glide door 106 (not shown in FIG. 13) is shut. The overhead shaft door track 118 is shown with the track rollers 120 retracted indicating that the shaft glide door 103 (not shown in FIG. 13) is open allowing the run door 133 which is connected to the shaft tube case 125 to fill the shaft part of the gap 138 when running to avoid drag. The run door 133 is seen settled into the opening 138 in this FIG. 13 side view in contrast to the way the run door 133 looks in FIGS. 11 and 12.

The rubber wall 102 is seen torqued out in the process of following the extreme angle of the rigid drive 101 in the down position. The rubber wall's 102 pleats are shown alleviating the stress on the wall's 102 four sided cabin seal. The motor 1 and motor mount 123 are seen in a maximum tilt, pivoting on the axis bolts 132 supported by the motor mount stand 124. A side view of the screw-on waterproof access covers 10 are shown atop cabins 23 and 24 providing waterproof seals as well as access for service and inspection.

Figure 14:
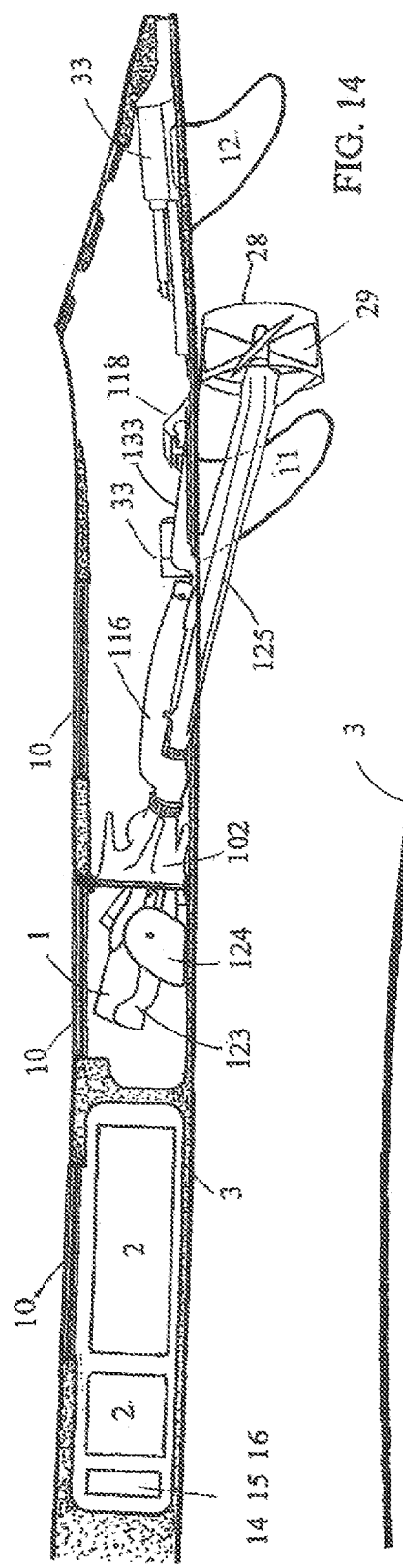
FIG. 14 is a cutaway side view of one embodiment of three cabins contained within the motor battery drive case housing the retractable rigid drive in the Down position for reference to FIG. 15.

FIG. 14 shows a cutaway side view of one embodiment of three cabins 22, 23, 24 housing the battery packs 2, the control means 14,15,16, and the disappearing rigid drive train 101 seen here at the bottom of the down stroke with the power on. The view is shown lined up next to the top view on FIG. 15 for comparison and component identification.

Figure 15:
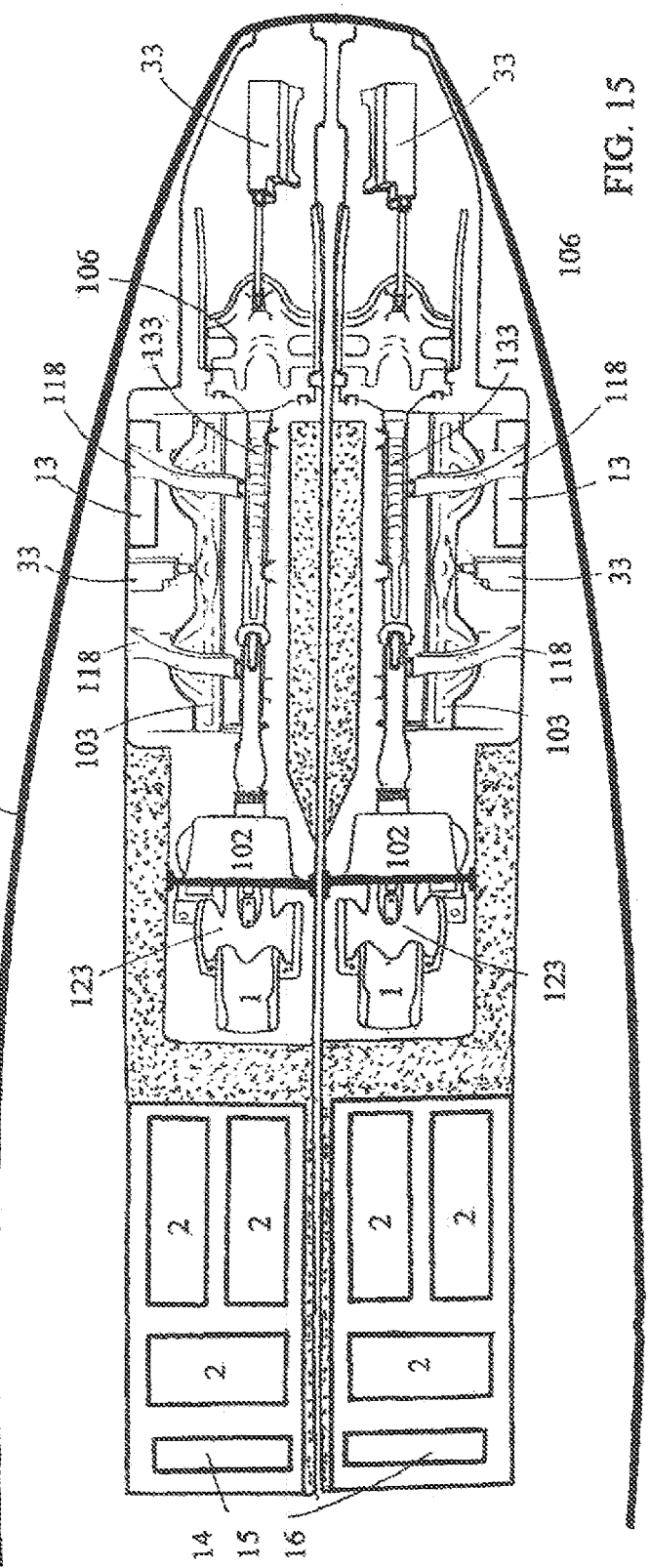
FIG. 15 is a see through top view of the port and starboard motor battery drive cases showing one embodiment of the retractable rigid drives in the Down position with all other components in view.

FIG. 15 shows a cutaway top view of one embodiment of three cabins 22, 23, 24 times two, of the twin retractable rigid drive 101 surfboard 3. The way it would look if the case decks 36 of both motor battery drive cases were removed. The outline shape of a short modern surfboard 3 is shown to give a perspective of how both MBD cases 4 can bond up to the surfboard stringer 32 (Not Shown) and fit within the parameters of a small surfboard. Both rigid drive trains 101 are at the bottom of their down stroke with the prop glide doors 106 closed and the shaft glide doors 103 open while the run doors 133 are in their closed positions. The three aforementioned door settings are the end result of the drive sequence, the same as the side view shown in FIG. 14.

The dry battery boxes are large enough to store three removable battery packs, each producing up to 48 volts or more. A voltage regulator/speed control 14 contained in the control box 64 can combine all three battery packs 2 to unload 144 volts at once into a brushless motor 1 to produce extremely high rpm's and top speeds. Another setting could draw from one battery pack 2 at a time to run at one third throttle with 48 volts while cruising and conserving energy.

The battery cabin 22 can be separated from the MBD case 4 if the individual builder decides to mount it further forward on longer boards. However the other two cabins, the motor cabin 23 and the drive cabin 24, may not be separated by the builder because the molded case base 36 supporting the motor 1, rigid drive 101 and the glide doors 103, 106 must remain rigid and stable in its length and width. The precise fit and tight tolerances required to run the motor 1 and drive train 101 while moving up and down through the drive opening 138 and interacting with the glide doors 103, 106 cannot be interrupted by unwanted flexing or twisting. Also, the molded case base 37 has a "rocker" or continuous curve length wise that is molded into the case base 37 in order to match up to all surfboard rockers. The manufacturer of the MBD case 4 must offer three or four different molded case bases 37 with different rocker curves to accommodate the myriad various surfboard styles and shapes. This continuous curve of a modern short surfboard 3 can be seen in FIGS. 12-14.

This FIG. 15 top view shows both actuators 33 fully extended holding the prop glide doors 106 closed, also seen in FIG. 6. This is also shown in a side view in FIG. 14. The shaft glide doors are seen opened in FIG. 15 to make way for the run doors 133 to be closed and butting up to the closed prop glide doors 106. This top view shows the three notches cut out of the run doors 133 that are necessary to clear the shaft door stops 121 when the run doors 133 are on their way down to the final closed position, fitting into the tiny stair steps molded into the opening 138 shown in FIG. 5. The run door 133 notches are designed to clear the door stops 121 but not the lower ledge of the molded-in stair steps 138 thereby maintaining a water resistant seal and seamless fit when the run door 133 is all the way down providing a smooth planning surface while under power.

Figure 16:
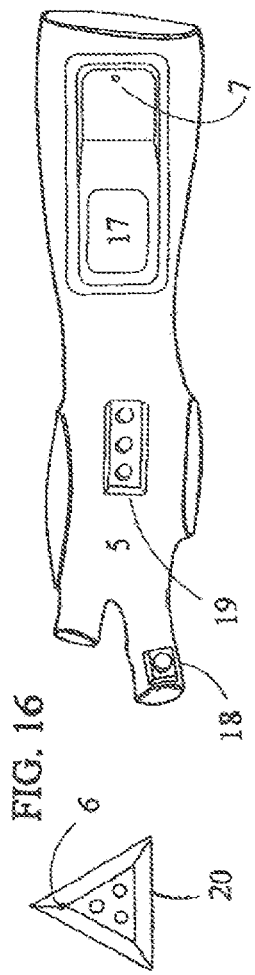
FIG. 16 is a top view of one embodiment of the control glove with control buttons and radio transmitter and the receiver wafer with battery level lights.

FIG. 16 shows a top view of one embodiment of the wireless control means preferred to operate the twin drive-n-glide electric powered surfboard 3. A triangular shaped wafer is seen housing the radio receiver antenna 6 and an LED light battery gauge readout 20 that is flush fit into the surface of the surfboard 3 deck, preferably in the nose region as shown in FIG. 2. Naturally, wires are run inside the body of the surfboard 3 (not shown) from the triangle wafer to the control box 62.

FIG. 16 also shows the control glove 5 that transmits the desired signals to the aforementioned triangle receiver 6 via the transmitter antenna 7 signaling out of the transmitter and battery case 17 located on the wrist area of the control glove 5 that is constructed out of sewn and glued neoprene material as seen in FIGS. 68 and 69.

A thumb to the middle part of the forefinger button 18 is shown that turns the twin drives 101 on and down or off and up. Also a three speed button control 19 is shown attached to the control gloves 5 top hand area. The buttons on this control 19 must be operated by a finger on the rider's opposite hand.

Figure 17:
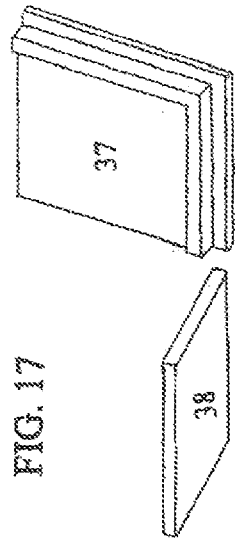
FIG. 17 is a sample cut view of the motor battery case's molded base and easy to bond sidewall.

FIG. 17 shows a corner sample of the molded-in side wall seats of the MBD case base's perimeter 37. The step like moldings make it easy for the builder to glue up the motor battery drive case sidewalls 38, 39, 40, 41 the molded case decks 36 provide the same perimeter shape (not shown).

Figure 18:
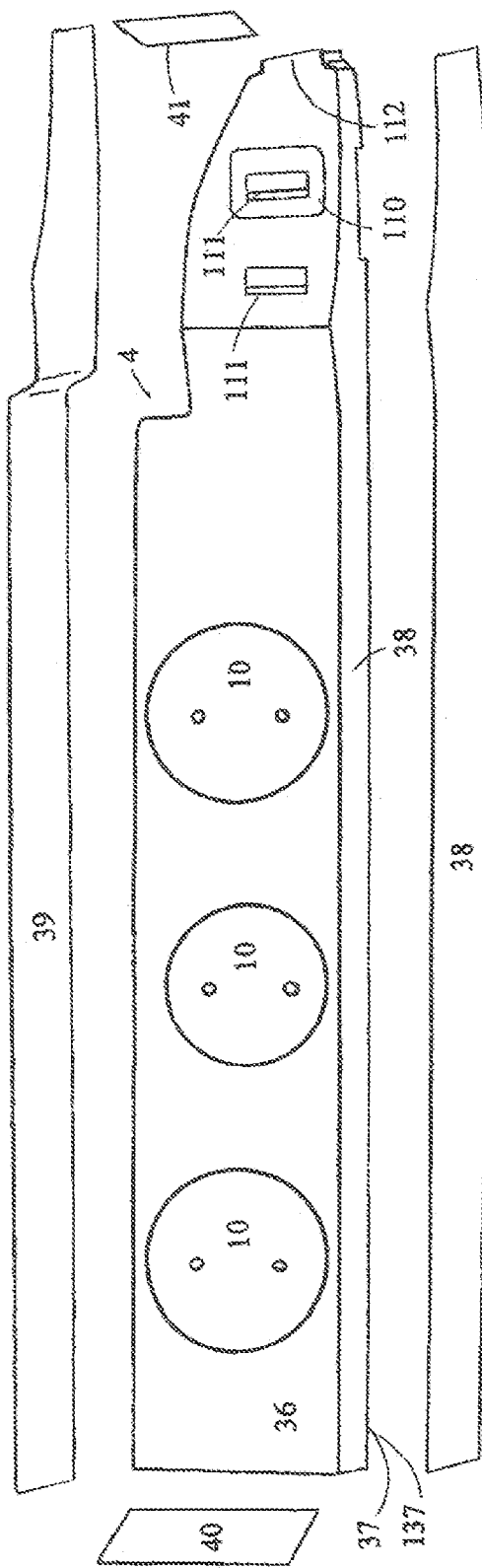
FIG. 18 is an angled top view of one embodiment of a preassembled starboard motor battery drive case with uncut sides and ends shown next to their respective placements

FIG. 18 shows a slanted top view of one embodiment of the rigid drive motor battery drive case 4, starboard side. This unit 4 is complete and ready to install into a surfboard body. Also shown are the four side panels 38, 39, 40, 41 of an unassembled motor battery drive case. These panels represent a custom option for the individual surfboard builder. They are shown oversized and unattached to the MBD base 37, 137 and cover 36. The individual builder preferably should be able to order the MBD cases 4 fully assembled with the pre-determined rocker and side thicknesses bonded and ready to install. Or, a builder could order the MBD cases un-assembled and actually cut their provided side panels to their preferred specifications. This frees up the builder to motorize just about any surfboard shape by being able to make the MBD case 4 fit a desired thickness plan shape, accommodating different size motor 1, batteries 2, and interior components that would determine the finish thickness of the surfboards body 3 within the crowned deck 25 prone and standing area.

A continuous rocker must be molded into each case base 37 because it 37 must remain semi rigid for the motor cabin 23 and the drive cabin 24 to sustain free movement of the working parts involved. This is why at least three different continuous rocker curves should be offered to the surfboard builders. This should be sufficient because the difference in rocker curve over the short length span of the two cabins 23 and 24 is less than one half inch. This covers the "within" measurement of almost all surfboards made. So a manufacturer marketing three different rocker curves varying at one eighth inch increments should cover the field. Considering the forgiving fact that the case base 37 can be bent slightly for final bonding and the builder can use small amounts of fairing compound to blend any slightly unmatched high and low glue lines that may occur when bonding the MBD case 4 into the surfboard body. The case deck 36 should be manufactured more flexible that the case base 37 so it can follow the slightly different custom curves before bonding it to the case sides 38, 39 once the case deck 36 is bonded to the case sides 38, 39 and therefore bonded to the case base 37. The deck 36 becomes more rigid and altogether strong enough for a full grown man to stomp on without incident.

The case deck 36 is seen in FIG. 18 with three access covers 10. They allow waterproof access to the motor cabin 23, the battery cabin 22 and the drive cabin 24. The case deck 36 should be built with the access cover's 10 threaded openings also preferably molded into the deck 36 to provide a consistent flush fit when the covers 10 are tightened down, with one caveat . . . the covers 10 have to stand slightly proud to allow space to put down laminates of fiberglass needed for construction to integrate the MBD cases into a surfboard body.

The same step shaped sidewall seats that are molded into the case base 37 should be molded into the case deck 36 making it simple for the builder to squarely match up and glue the deck 36 to the sides 38, 39 ends 40, 41 and base 37 (shown in FIG. 17). The preferred material to produce the MBD cases would be a high density foam or lightweight wood with fiberglass laminate on each side. The molded base 37 and deck 36 will vary in thickness between $\frac{1}{8}^{th}$ and ½ inch while the sidewalls 38, 39, 40, 41 should be at least $\frac{1}{8}^{th}$ inch thick.

The one way water vents 111 are shown in FIG. 18 with access cover 110 surrounding it. This cover 110 has a gasketed perimeter and is held down by two machine screws (not shown). It allows access to service the prop door actuator 33. The one way vents 111 are equipped with sprung flaps (not shown) and will allow water pressure to pass from the inside out but not vise versa. The bottom vent 112 or bilge vent is placed at the farthest tail end of the MBD case 4. It is also at the lowest point at the end of a network of waterway grooves molded into the case base 37 to allow water to flow out the one way bilge vent 112 with forward movement of the surfboard. Without these vents 111, 112 the drive cabin 24 would retain too much water, diminishing surfing performance by the extra onboard weight. The bilge vent 112 can have a tunnel added to it to extend to the end of longer boards shown in FIGS. 60 and 61. Also, electric bilge pumps could be utilized to guarantee a dry drive cabin 24 (not shown).

Figure 19:
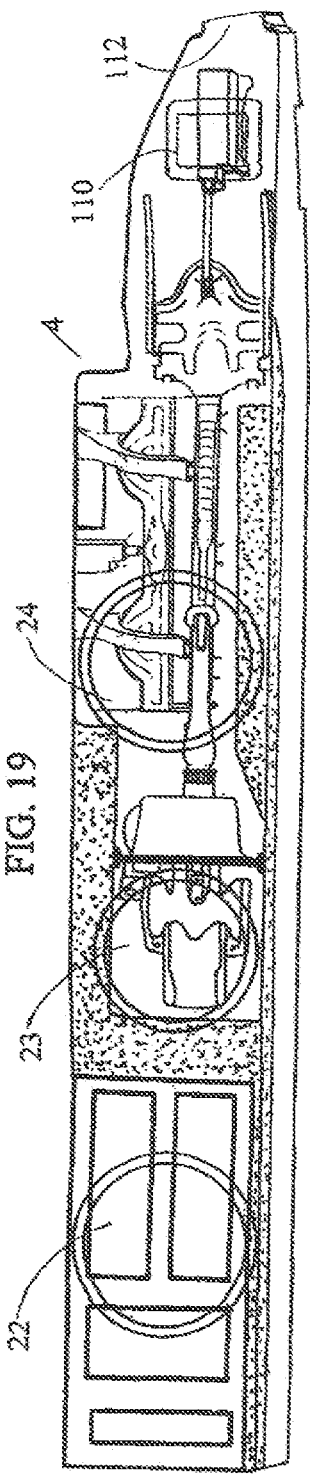
FIG. 19 is an angled see through top view of one embodiment of a preassembled starboard MBD case showing interior components of the retractable rigid drive for reference to FIG. 18.

FIG. 19 shows a slanted top view of the same motor battery drive case 4 shown in FIG. 18 with the case deck 36 removed for interior component viewing. The cover sites are shown 10 and 110 to understand their preferred location over the rigid drive components in cabins 22, 23 and 24.

Figure 20:
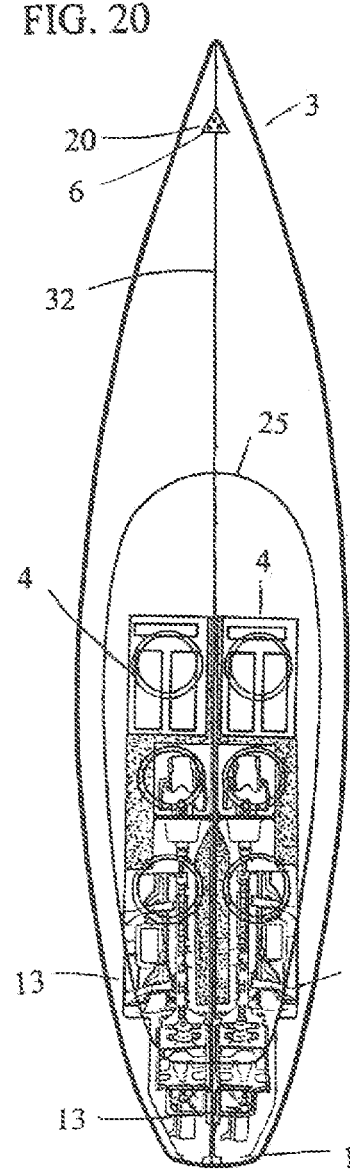
FIG. 20 shows a see through top view of a twin retractable rigid drive motorized short surfboard 3 that displays all the interior components inside the MBD (Motor Battery Drive) cases 4.

FIG. 20 shows a see through top view of a twin retractable rigid drive motorized short surfboard 3. The hardwood stringer 32 is shown running the length of the surfboard 3 and bonded to the two MBD cases 4. The crowned deck 25 perimeter is shown designating the prone/standing area. The six access cover 10 locations are indicated by double lined circles and the two aft access covers 110 are indicated by double lined squares. The two bilge vents 112 are seen exiting the MBD 4 cases on either side of the stringer 32.

The three fin boxes 13 are shown nestled between the MBD cases 4 also shown is the wireless receiver antenna 6 and the battery gauge display 20 in the triangle wafer that is flush fit into the surfboard 3 deck at the nose.

Figure 21:
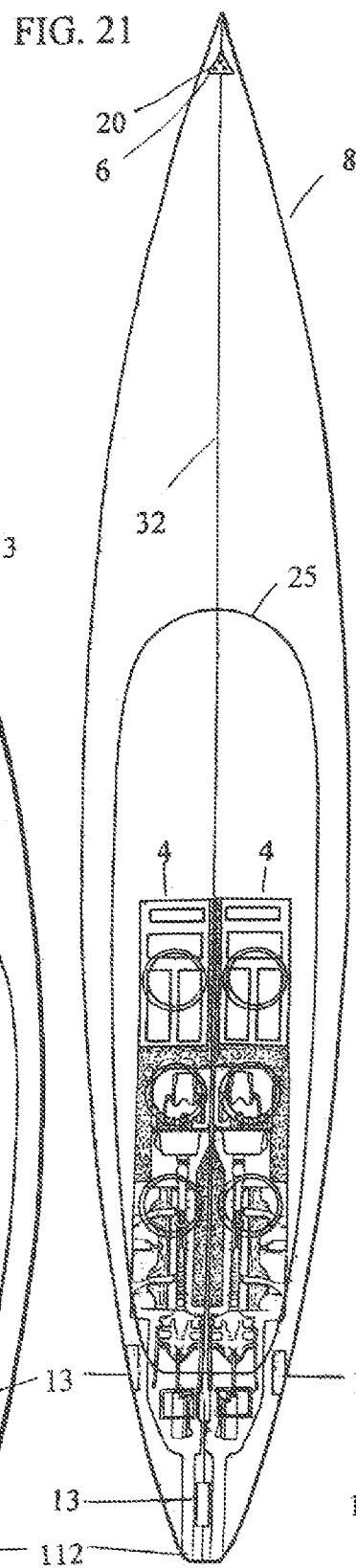
FIG. 21 shows a see through top view of a twin retractable drive 101 motorized Waimea Gun surfboard 8 that displays all the interior components inside the MBD case 4.

FIG. 21 shows a see through top view of a twin retractable rigid drive motorized Waimea Gun surfboard 8. The hardwood stringer 32 is shown running the length of the surfboard 8 and bonded to the two MBD cases 4 the elongated crowned deck perimeter 25 is shown designating the prone and standing area. The six access covers 10 locations are indicated by double lined circles and the two aft access covers 110 are indicated by double lined squares. The two bilge vents 112 are seen with extension tubes extending out the extra length to the tail end on either side of the stringer 32 to either side of the fin box 13. The two side fin boxes 13 are shown outside the MBD case 4. Also shown is the wireless receiver antenna 6 and the battery gauge display 20 in the triangle's wafer that is flush fit into the surfboard 8 deck at the nose. This Waimea Gun twin rigid drive surfboard 8 is designated to achieve top speed with the power on in order to drive into 20' to 50' waves. This 10'4" gun is narrow and long providing good flotation with minimal drag. The board can power forward fast enough to allow the rider to stand up while fielding and ultimately catching huge, fast moving ocean swells.

Figure 22:
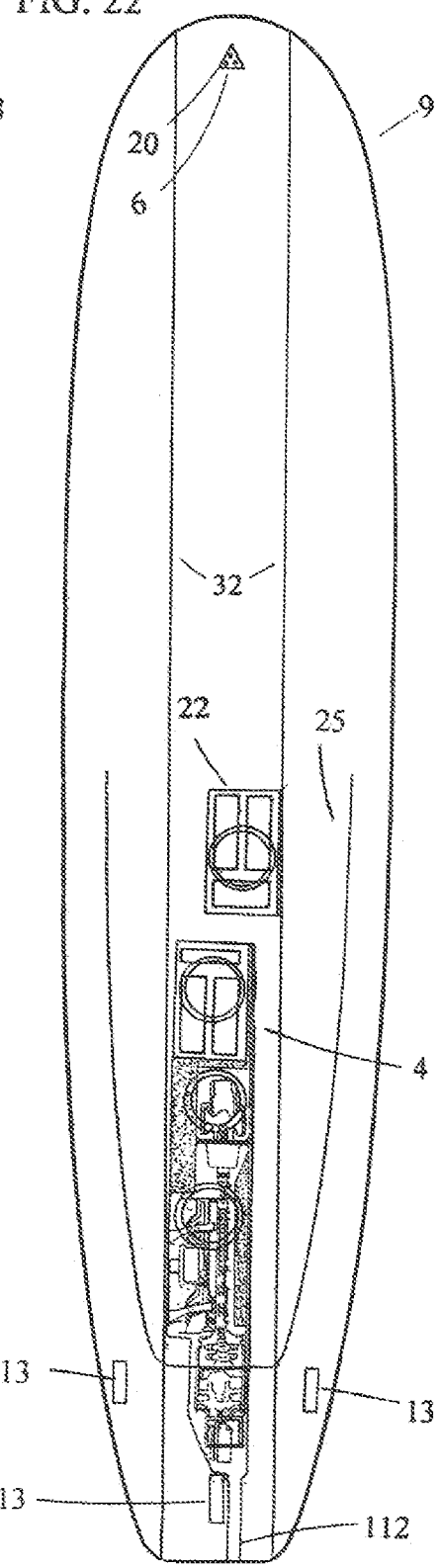
FIG. 22 shows a see through top view of a single retractable drive 101 motorized longboard/paddleboard 9 that displays all the interior components inside the MBD case 4 plus the extra battery cabin 22.

FIG. 22 shows a see through top view of a single retractable rigid drive motorized longboard/paddleboard 9. Two hardwood stringers 32 are shown running the length of the surfboard 9. Bonded to the port stringer 32 is the MBD case 4. Also shown is an extra battery cabin 22 that is bonded to the starboard stringer 32. This design centers the rigid drive 101 at the propeller 26 or impeller 29 as well as the weight distribution. The crowned deck perimeter 25 is shown designating the aft prone paddling and standing area. The fore deck shows the crowned deck 25 fading out into a non-stepped, slightly thicker than normal deck area. This design is necessary on a longboard shape to allow the surfer to walk the board and hang toes over the nose which is a core move in longboard surfing. The MBD case 4 indicated by double lined circles and the one aft access cover 110 is indicated by double lined squares. The single bilge vent 112 is seen with an extension tube extending it out to the tail's end on the starboard side of the tail fin box 13. The two side fin boxes 13 are shown outside the two hardwood stringers 32. Also shown is the wireless receiver antenna 6 and the battery gauge display 20 in the triangle wafer that is flush fit into the surfboard deck 9 at the nose.

This longboard/paddleboard single drive surfboard 9 shows how versatile the MBD case 4 is for the surfboard builder. A single drive is all that is called for in this 10' long paddleboard. It is not a board that is seeking a top speed. Rather, this board is designed for stand up paddling with electric motor assistance or prone paddling with electric motor assistance with the intent to cruise at slow speeds while conserving energy with the capability of long run times. The three extra battery packs contained in cabin 22 can extend the run time considerably.

FIG. 23 is a top view of the retractable rigid drive short surfboard 3. The stringer 32 is seen running the length of the surfboard 3. The crowned deck perimeter line 25 shows where the raised deck edge begins and ends. Dotted cutout lines are shown to indicate where the cut profile samples seen in FIG. 24 are cut. The six access covers 10 are shown between two foot placements in a regular foot stance (left foot forward). These foot placements represent where an adult surfer would stand on a short modern surfboard.

FIG. 24 shows seven cross cut thickness profile samples taken from the stations indicated by the dotted cut lines shown in FIGS. 23 and 25. These thickness samples show the rail shapes and in particular the crowned deck's 25 unique profiles. The first two from the nose show an average surfboard thickness. The next one down shows the forefront of the crown shape 25. The next sample down at the middle of the surfboard 3 shows the crowned deck 25 shape that allows a thin railed wave print from an extra thick surfboard body 3. The thickest part of the rail is inset from the edge just far enough for the water to flow over the thin portion without bouncing off the thick portion when the board is planed up and turning. The next lower thickness sample 25 shows about the same inset as the midships sample above it, which is approximately the minimal amount of inset that is functional. The next lower crowned deck 25 sample is the thickest part of the surfboard which is the rear foot kick tail area. This extra thick section allows space for the impeller 29 and cort nozzle 28 to fit into as well as provide a rear foot berm to push up against when under acceleration.

A plurality of design variables are possible with the present invention's crowned deck 25 being added to an otherwise thin railed 2¼" thick surfboard body. For instance, there's the amount of inset on rail; the amount of kick tail; the amount of front foot kick; the amount of overall thickness lengthwise across the crowned deck. Then there's the correct shape at the hand grab site 63 FIGS. 26, 27 to facilitate maximum hand grip while maintaining the basic inset 25 dimensions and shape. There's also the longitudinal or latitudinal convex or concave subtle curves on deck that may be preferred by certain surfers. This would call for curved access covers. The aforementioned are all design factors of the crowned deck 25 that can be custom tailored to the individual surfboard shaper's and builder's designs.

FIG. 25 shows a side view of one embodiment of the retractable rigid drive short surfboard 3. The main purpose of this view is to compare cut lines to FIGS. 23 and 24. The crowned deck 25 is shown in one of many different possible deck thicknesses. This one is seen as relatively flat lengthwise and is the same from port to starboard making it possible to use the circular screw-on access covers 10. If some custom contours are desired the rider can use rear foot pads (not shown) which are applicable and welcomed on the present invention's crowned deck 25. These aftermarket rear foot pads (not shown) provide traction and can be trimmed with a razor to stick on top of the deck where it crosses over the circular access covers 10 that need to be able to spin.

The kicktail shape is optional but if desired can provide clearance for the impeller 29 and cort nozzle 28. Therefore the individual surfboard shaper will determine where the rear foot will be placed which in turn will determine where the propellers 26 or impellers 29 will be placed. This will also determine where the fins 11, 12 are placed. Most modern surfboards have 3 or 4 fins that naturally surround the dual drive cort nozzles 28 or open props 26, 27 shown in FIGS. 28 through 30 providing damage protection from rocks and hard obstacles.

FIG. 26 shows a top view of the dual Drive-N-Glide short surfboard 3 with hand landing and grip areas 63. These grip areas have softened ridge shapes on the crowned deck 25. These flatter shapes conform better to the palm of the hand. These landing areas 63 are forward of the center of the board so they don't interfere with the water flow on the rails when planed-up and turning.

Encased in the middle of the right hand grip area 63 is an elongated on/off button 51. One downward push on this button 51 will shut off the motor 1, retract the drive 101 and shut the glide doors 103, 106. This all happens just as the surfer grabs the rail and deck 63 to push up with his arms to go from a prone to a standing position which is at the same instant he has caught the wave and is dropping down the wave face.

This manually operated button 51 eliminates the need for a more expensive wireless control means but limits the operation to a single speed, either on or off. The elongated button 51 has a flush fitting case with a slightly raised clicker button that is spring loaded to bounce back and reset after clicked and released. The button 51 and case are of course water proof and the long shape makes it easy to aim at. The next time the clicker button 50 is pressed it will open the glide doors 103, 106, push down the rigid drive train 101 and turn the power on.

FIG. 26 also shows a top view of a crowned deck 25 that may have subtle deck curves in the prone and standing area. Therefore, the circular screw-on covers 10 won't work. Instead, curved access covers 64 that pull straight up must be used. The square outline shape of the covers 64 shown in FIGS. 26 and 27 are one embodiment of access covers that could be used, but must be fastened with multiple flathead machine screws and waterproofed by O-ring gaskets.

FIG. 27 shows the same top view of the retractable rigid drive short surfboard 3 as in FIG. 26 but with hands placed to show them in the act of pushing a surfer up to the standing position while at the same time clicking the on/off button 51 to retract the rigid drive trail 101, shut off the power, and close the glide doors 103, 106.

All the different versions of the crowned deck design 25 outlined in FIGS. 20, 21, 22, 23, 24, 25, 26 and 27 have one thing on common; they have a raised deck to accommodate interior components and increase flotation, with an inset maximum thickness at the side rails to maintain a thin railed wave print. The crowned deck 28 shapes outlined in this application are just a few of the many possible embodiments. Some version of the crowned deck 25 will always be necessary if the surfboard designed is to retain fine wave handling traits by making the wave print of a two and a half inch thick surfboard and because of the space needed for large interior components that also require extra flotation for the added onboard weight needed to be addressed. This crowned deck 25 design faces reality and solves two problems for motorized surfboards.

FIG. 28 shows a cutaway side view of the retractable rigid drive 101 in the down and run position. It shows all the components that make up the rigid drive train 101 from the motor 1, the rubber wall 102, the pivotal motor mount body 125, the shaft hanger 110 and the shaft tube case 125. All these components are seen supporting a three blade propeller 26 instead of the cort nozzle 28 and impeller 29 shown throughout this application. The open propeller 26 would rely on the onboard sensor 65 to turn off the power and retract the prop 26 in the event of a wipeout, for safety reasons. With the sensor 65 in operation the use of open propellers 26 is a safe and viable option for motorized surfboards.

FIG. 29 shows a cutaway side view of the retractable rigid drive 101 in the down and run position. All the aforementioned connected components 1, 123, 116 and 125 are seen supporting a twin torpedo style, in line counter rotating, four and three blade propeller set 27. This prop set up provides the most thrust per shaft and will allow for the thinnest possible motorized surfboard body and may trump the need for a kick tail. Relying on the theory of 4 smaller diameter props 27 could produce the same thrust as two larger ones. With the shut off sensor 65 in operation the use of open propellers 26, 27 can be a safe and viable option for motorized surfboards.

FIG. 30 shows a cutaway side view of the retractable rigid drive 101 in the down and run position. All the rigid drive connected components 1, 123, 116 and 125 are seen supporting the aforementioned cort nozzle 28 and impeller set 29 that embodies the safest arrangement for a motorized surfboard with mass market appeal.

FIG. 31 shows a top view of one embodiment of a wireless control glove 5 fit over a right hand. This view shows the control means to operate the rigid drive 101 and flex drive 201 (not shown) or a jet drive 301 (not shown) motorized surfboard 3. It is preferably made out of neoprene wetsuit material. The optional design of covering at least two fingers is a minimal configuration meant for warmer waters of summer conditions though it could be stretched to fit over a winter wetsuit and glove. The overall length extends from the glove's ⅔ covered forefinger all the way up the wrist past the middle of the forearm. The extra length is necessary to hold the waterproofed wireless transmitter and battery case 17 that is positioned on the top of the wrist. This is important because the top of the wrist is level with the top of the hand which is unlikely to accidently bang up against or involuntarily touch the surfboard when grabbing the rail to push up. The three speed control 19 is shown center mounted on the top of the hand. This button 19 allows the surfer to set one of the three speed settings at a time and therefore three different rates of battery drain. The speed control button 19 is designed to be pressed by a finger on the opposite hand.

The specially placed on/off button 18 is seen at the midpoint of the forefinger between the top and the side. This exact position allows the thumb of the same finger to press the button 18 on and off and it is less susceptible to accidental or unwanted pressing. The button 18 position is in line with the top of the hand like the other components 19, 17, 7 and won't contact the surfboard when the surfer reaches to grab the rail and push up from a prone to a standing position.

FIG. 32 shows a side view of the same wireless control glove 5 shown in FIG. 31. The clicker type on/off button 18 is shown mounted at the perfect spot to be pressed by the thumb without being activated by a rail grab. When the water proofed clicker type button 18 is pushed it sends a signal through the transmitter antenna 7 to the surfboard's receiving antenna 6 located at the nose of the surfboard 3 then travels down a wire (not shown) on the stringer 32 to the control box 62 containing the speed control 19, the wireless receiver 15, and the micro circuit controller 16. Then the signal travels to the glide doors 103, 106 opening them first, then to the rigid drive servo 107 dropping the drive train 101 into the water as it turns on the motor 1.

When the clicker button 18 is released it resets itself to be pushed again. The next time it gets pushed it repeats the aforementioned sequence in reverse retracting the drive train 101 and shutting the glide doors to ride a wave.

The speed control buttons 19 are preferably raised off the case surface when inactive and flush when pushed, therefore activated. Also, when one button is pushed the one next to it will push up automatically and turn off. This is just one embodiment of a speed control 19 but its placement is critical to this type of hand control. The Velcro cuff strap 42 is shown in this side view. It provides a re-closeable split in the control glove 5 making it easy to take it on and off as well as a way to make one size fit all.

Figure 33:
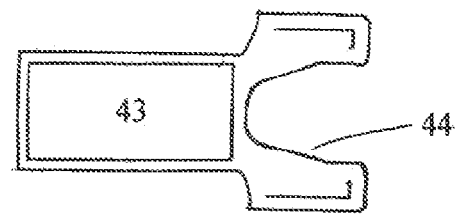
FIG. 33 shows a top view of a servo 43 encased in a special rudder steering servo stand 44.

FIG. 33 shows a top view of one embodiment of a return servo 43 encased in a special servo stand 44 that hovers over the center fin 12 to control it to steer the surfboard wirelessly back to the surfer that lost it.

Figure 34:
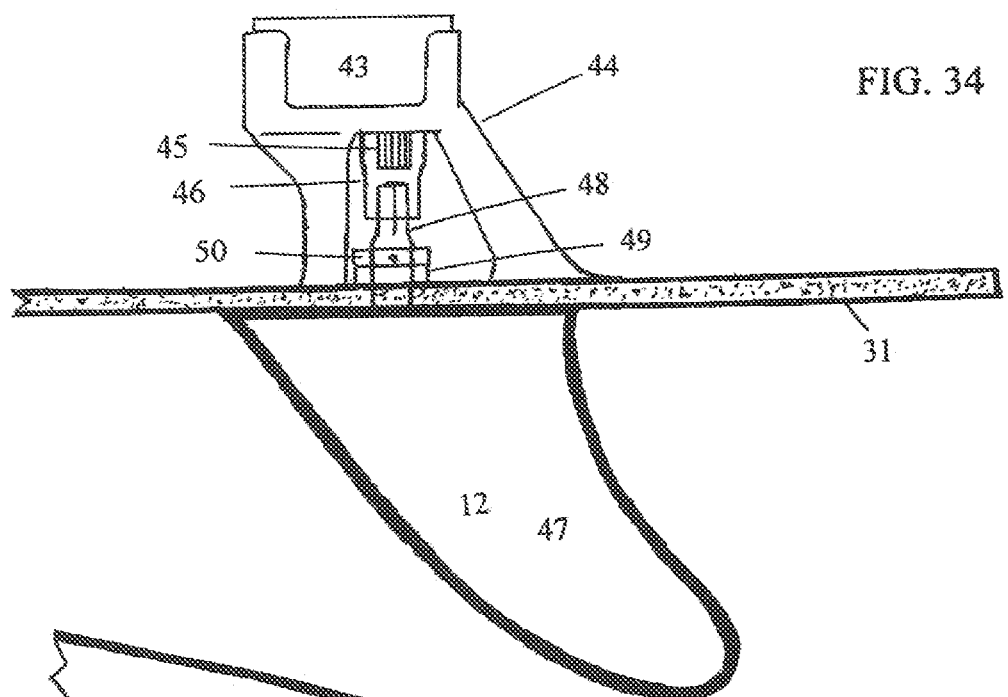
FIG. 34 shows a side view of a top mounted 44 servo 43 driven rear surfboard fin 12 turned into a rudder 47.

FIG. 34 shows a side view of one embodiment of a top mounted 44 servo 43 driven rear surfboard fin 12 turned into a rudder 47. The fin 12 which is now a rudder 47 has a post 48 that penetrates the MBD case 4, 31 through a hole. A thick post base washer 49 fits over the post 48 and is caulked to the inside of the case 4, 31 and has an O-ring (not shown) to stop water from gushing into the drive cabin 24. A collar 50 is fitted over the post 48 on top of the base washer 49 and has a set screw to lock the collar 50 in place. Therefore setting the rudder fin 47, 12 in place allowing it to turn on command. The rudder post 48 has a square top that fits into a female square socket shaped connector 46 that fits over the multi-tooth servo crank 45. This construction allows the electronic servo 43 to take commands from a dead-stick tracking program, wired into the micro circuit controller 16 located in the control box 62 which is located in the dry battery cabin 22. The commands are transmitted from the surfboard recovery glove shown in FIGS. 36 and 37.

Figure 35:
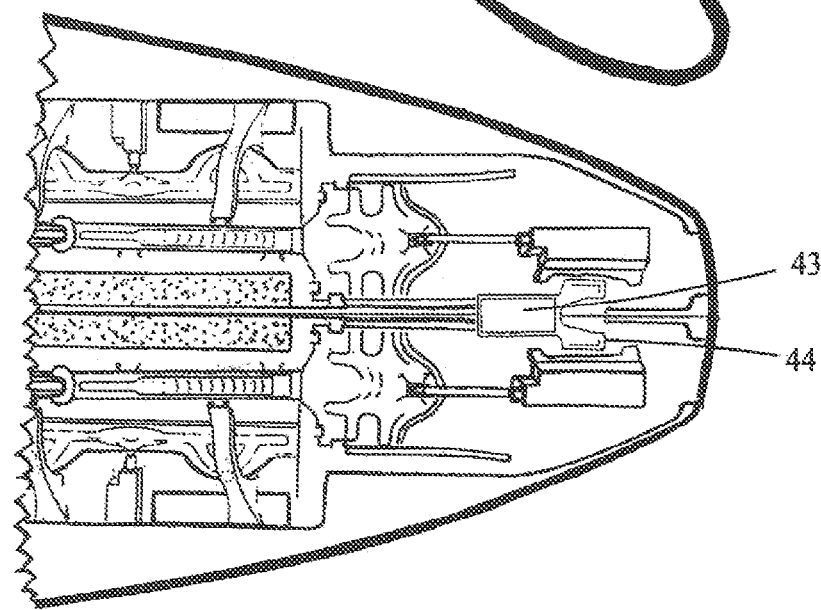
FIG. 35 shows a top view of the rudder servo 43 and stand 44.

FIG. 35 shows a top view of the rudder servo 43 and stand 44 that hovers over the fin 12 rudder 47 and post 48 showing how the optional recovery system can fit between two MBD cases 4.

FIG. 36 shows a top view of one embodiment of a surfboard recovery glove 55 worn on a left hand. This recovery control means has a thumb to forefinger button 53 that activates the GPS screen located on the top of the wrist and forearm on the same plane as the top of the hand. This is important because the component's buttons are less likely to be accidently pressed and won't activate on a rail grab when the rider pushes up to a standing position. The GPS screen 54 can display an aerial view of the surf spot and shore line where the modern wireless motorized surfer is surfing. It can display the location of the surfboard in the event the surfer gets separated from it. This informs the surfer if the board is already on the beach, on the rocks or anywhere in between. When separated from the surfboard a surfer has limited visual scope because his eyes are just a few inches above the surface of the water and often has difficulty locating it. The GPS screen 54 solves this dilemma. He can press the screen button 53 then watch the GPS screen 54 showing a target marker where the surfer is and a target marker where the surfboard 3 is. When the surfer presses the return button 21 and the on/off button 18 the dead-stick tracking program is activated and he can then watch on the screen as the board marker moves closer to his position, the surfer marker. When it gets within visual range he can then shut the power off by pressing the on/off button 18, then catch the board and remount.

FIG. 37 shows a side view of the recovery glove 55 shown in FIG. 36. It shows the top of the wrist mounted case 57 that contains a wireless transmitter, a GPS receiver and tracking screen 54, plus a rack that holds four AAA batteries generating six volts of electricity. The case 57 has a removable panel to access the batteries that is waterproofed by two screws and a gasket (not shown). Or, there could be a rechargeable battery pack with a charger plug allowing the battery pack to stay in the case 57 and be charged like a cell phone for example. The GPS receiver gets a satellite signal that produces an aerial view of the surf spot and pinpoints the surfer's exact location on that map. The transmitter 7 sends signals to the surfboard's 3 receiving antenna 6 then to the circuit controller 16, then out to the rudder servo 43 with commands to steer back to the surfer wearing the recovery glove 55. The commands are possible because of a known "deadstick" technology which is somewhat similar to frequency hopping but more like signal bouncing and measuring. The dead-stick circuitry built into the control box 62 inside the surfboard 3 traces the signal coming from the surfer and glove 55 using its origin as a homing beacon to steer a course back to the surfer. This homing beacon also allows the GPS screen 54 to indicate where the surfboard 3 is located by bouncing signals back and forth. The on/off button 18 on the right hand can control the motor without the surfer on it by overriding the wipeout sensor 65 as long as the recovery button 21 is pressed on. Manual control of the motor 1 allows the surfer to first determine if the board 3 is on the beach or caught inside a set of breaking waves, headed for the rocks. He can shut the motor 1 off therefore retracting the drive 101 and closing the glide doors 103, 106 to minimize damage. Or, if he sees that the coast is clear in between waves he can turn on the power and turn the surfboard towards him. This board return technology is optional, expensive and not necessary for most surfing conditions. But it is possible and can be an asset when surfing giant waves where a board leash is not desirable.

FIG. 38 shows a front view of the complete modern wireless motorized surfer and a top view of the modern wireless motorized surfboard 3. It shows the surfer wearing the wireless control glove 5 on his right hand and arm. The wireless transmitter and battery case 17 is seen on his forearm. The transmitter antenna 7 is shown at one end of the case 17. The transmitter antenna 7 sends the signal to the receiver antenna 6 located at the nose of the surfboard 3. The wireless moto surfer is also seen wearing a board recovery glove 55 on the left hand and arm. The GPS receiver, wireless transmitter and battery case 57 is seen on the left forearm. The case 57 contains the GPS receiving antenna (not shown). However, a wireless transmitting antenna 7 is shown at one end of the case 57. The transmitting antenna 7 sends signals to the receiving antenna 6 located at the nose of the surfboard 3. The control glove 5 and the board recovery glove 55 are two embodiments of two control means out of seven control means outlined in this application of the present invention allowing individual preference to determine which control means suits the user.

FIG. 39 shows one embodiment of another wireless control means to operate a motorized surfboard. This one is a hip activated wetsuit 58. It has two slightly oversized clicker buttons 56 and 18 located just aft of center on both hips. This location is less likely to be bumped accidently by the surfboard 3 when the surfer is in the prone or standing position. This hip location also makes it easy to access from a prone, crouched or full standing position. The large size and protruding shape of the clicker buttons 18, 56 is desirable to make them easy to locate in a hurry. The on/off button 18 is seen on the surfer's right hip. The two-speed button 56 is seen on the surfer's left hip. The transmitter and battery case 17 is seen mounted on the surfer's upper back which is another location that is unlikely to be bumped accidentally. Wires connecting the two buttons 18, 56 to the transmitter case 17 are sewn and glued into the wetsuit 58. Another advantage to mounting the transmitter case 17 up high on the back shoulder is that the antenna 7 is at a heightened vantage point for wireless reception.

FIG. 40 shows a front view of the wireless hip control wetsuit 58 shown in FIG. 39. It shows the surfer pressing the two-speed clicker button 56 on his left hip.

FIG. 41 shows one embodiment of another wireless control means to operate a motorized surfboard. This one is a pair of hip controlled board shorts 59. The clicker buttons 56, 18 are shown in the same advantageous positions as on the hip control wetsuit 58 shown in FIGS. 43 and 44. The transmitter case 17, however, is mounted at the belt line on the backside of the board shorts 59 again to avoid unwanted accidental bumping. The buttons 18, 86 and the case 17 should be preferably mounted on a thickened, more rigid back ground that could be made out of foam, canvas, or wetsuit material. This background could be sewn, glued or somehow integrated into the upper part of the board shorts 59 and provide a more solid platform to support the components and push the buttons 18, 56 against. The transmitter antenna 7 is seen on one end of the case 17.

FIG. 42 shows a front view of the hip control board shorts 59 shown in FIG. 41. It shows how the component 18, 56, 17 background can integrate nicely into the upper portion of the board shorts. Wires connecting the buttons 18, 56 to the case 17 are glued in between layers of the background material. (not shown). The surfer's left hand is seen pressing the two-sided clicker button 56 against the board shorts 59 background at the hip.

Figure 43:
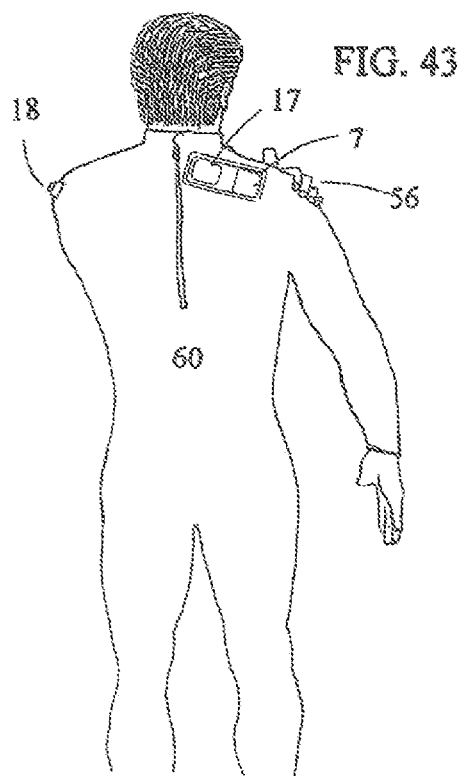
FIG. 43 shows a back view of one embodiment of a wireless shoulder control wetsuit 60 with two clicker buttons 18, 56 and a back mounted transmitter 7 and battery pack 17.

FIG. 43 shows one embodiment of another wireless control means to operate a motorized surfboard. This one is a back view of a shoulder control wetsuit 60. The clicker buttons 18, 56 are shown up high on the surfer's shoulders. This is another advantageous place to mount the clicker buttons 18, 56 by being out of the way when prone paddling or in the standing position. The other advantage is they are accessible in the prone, crouched or standing position by the opposite hand. Wires connecting the buttons 18, 56 to the back shoulder mounted transmitter case 17 are integrated into the wetsuit material. The transmitter antenna 7 is seen on the high back left shoulder.

Figure 44:
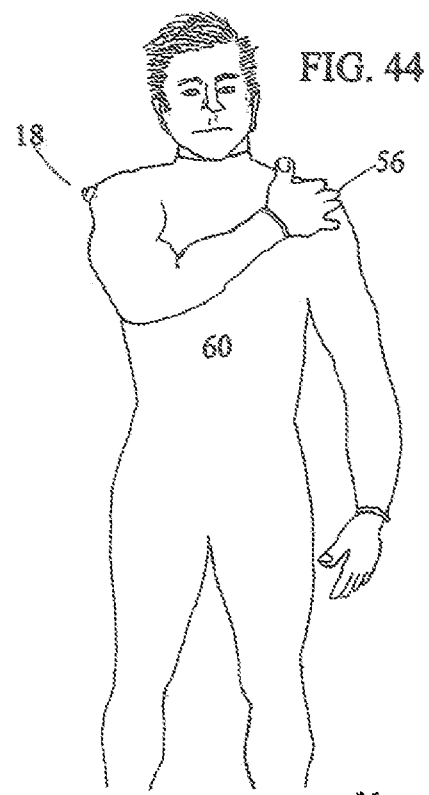
FIG. 44 shows a front view of the same wireless shoulder control wetsuit 60 shown in FIG. 43.

FIG. 44 shows a front view of the shoulder control wetsuit 60 shown in FIG. 43. It shows the surfer's right hand reaching over to press the two speed clicker button 56 on the left shoulder.

Figure 45:
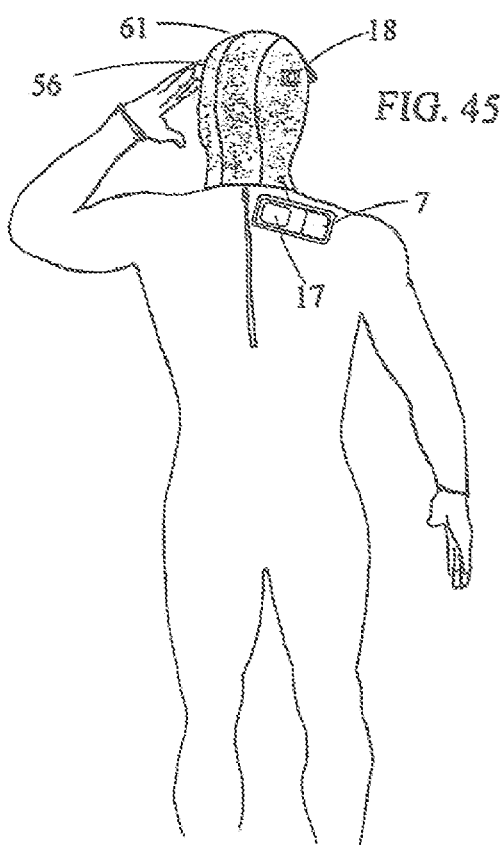
FIG. 45 shows a back view of one embodiment of a wetsuit helmet control means 61 with two clicker buttons 18, 56 and a back mounted transmitter 7 and battery pack 17 with a quick dis-connect wire.

FIG. 45 shows a back view of one embodiment of a wetsuit helmet head control 61 means to operate a wireless motorized surfboard. The clicker buttons 18, 56 are shown mounted just above the ears on either side of the wetsuit helmet 61. This provides an out of the way, easily accessible position for the clicker control buttons 18, 56. An attachable wire must travel from the wetsuit helmet 61 mounted buttons 18, 56 out to the transmitter case 17 to enable the surfer to take the helmet 61 on and off.

Figure 46:
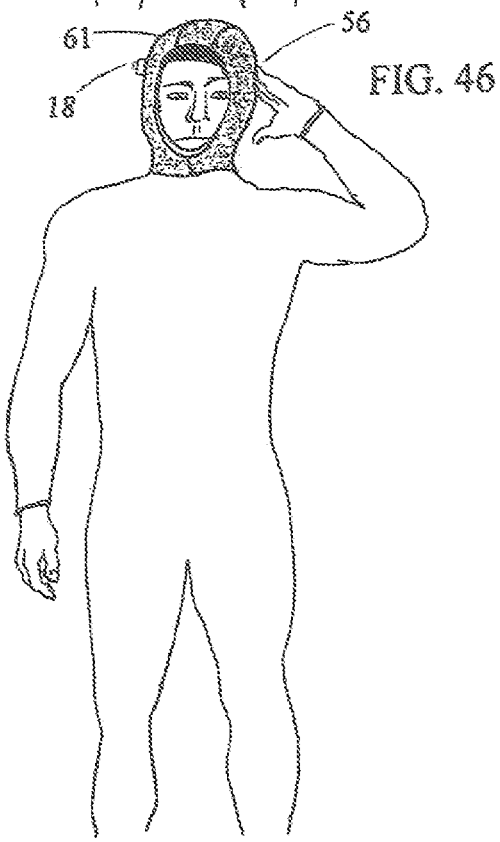
FIG. 46 shows a front view of the same wetsuit control helmet shown in FIG. 45.

FIG. 46 shows a front view of the wetsuit control helmet shown in FIG. 45. The surfer's left hand is seen pressing the two-sided clicker button 56 on the side of his head.

What is claimed:

1. A surfboard having a body with top and bottom surfaces, wherein the body of the surfboard is configured to support a surfer lying in a prone position or standing on the top surface wherein the bottom surface is a flat planing surface with no protrusions other than one or more aft placed fins that help maintain directional stability when the surfboard is moving forward, the surfboard defines a longitudinal axis having a nose at a forward portion of the surfboard and a tail at an aft portion with shaped outer edges or rails in between, the surfboard comprising a single stringer, a foam and fiberglass construction, and said one or more aft placed fins, the surfboard is configured to be electric powered and is equipped with at least one brushless motor that is operatively connected to at least one retractable rigid drive unit that is contained inside a motor battery drive case that has three separated cabins which are contained within the body of the surfboard that has a shaft which is encased in a rigid composite body or shaft tube case, that contains sealed bearing sets at either end wherein the shaft is operatively connected to an open propeller or a cort nozzle and impeller setup, wherein said retractable rigid drive unit is configured to emerge out onto the surfboard's bottom surface to power it forward, allowing a surfer to field and catch waves without paddling, wherein as soon as the wave is moving the surfboard forward, the surfer can make the drive unit disappear by retracting it back up into the surfboard's body by pushing a button that enacts a power off sequence provided in a radio circuit board contained within the body of the surfboard, and configured to retract the drive unit and to close at least one pair of flush fitting glide doors, that have a stair step shaped perimeter on three sides and a ramp shape on one side wherein a shaft door closes behind the shaft portion of the drive unit and a propeller door closes behind the propeller or the cort nozzle with impeller portion of the drive unit, also said glide doors are configured to close up tightly on a shaft and propeller opening wherein the opening's perimeter also has a three sided stair step shape with a one sided ramp shape but in corresponding shape to match up to the glide doors, which produces a substantially flush fit across the surfboard's bottom surface, thus allowing the surfboard's bottom to return to a planing surface without drive unit protrusions causing drag and disrupting water flow, therefore enabling the surfboard to glide freely and the surfer to ride on the wave's power only, wherein each of the at least one retractable drive unit is able to stroke up and down by way of a pivotal motor mount body that surrounds the brushless motor and is equipped with two flat faced alignment ears built onto the motor mount body that matches up against a stand that allows a see-saw movement up and down preventing any side to side movement, due to two wide, flat faced circular shapes that flush fit up against the motor mount body's large diameter flat faced ears, wherein a high torque servo provides an electronic means to move the rigid drive unit up and down, wherein a three point support structure is provided in order to maintain shaft alignment lengthwise wherein the shaft has the benefit of its supporting structure to be adjusted at three points enabling the shaft and the propeller to spin 100% true, wherein said three point structure connects to the shaft, the shaft to the shaft tube case, the shaft tube case to the pivotal motor mount body at a hanger connection site near a cone shaped opening that then surrounds the motor, holding it securely in place wherein the motor connects to the shaft; and a pleated rubber wall is provided to protect against damaging water by isolating two of the three cabins that comprise a first cabin housing a battery and designed to stay dry, and a second cabin housing the motor and the retractable rigid drive's up and down movement servo, wherein the other of the three cabins on an opposite side of the pleated rubber wall houses the shaft and the propeller and is designed to get wet, wherein the rubber wall is flexible and pleated to allow the up and down movement of the pivotal rigid drive unit while keeping the motor cabin dry, wherein a gear box is integrated near the cort nozzle portion of the shaft case that redirects the angle of the shaft parallel to the surfboard's bottom surface before it attaches to said cort nozzle and impeller setup, where the cort nozzle provides prop wash sorting, extra thrust and protection from propeller injury, whereas open propeller is made safe with an automatic shut off sensor, each of said at least one retractable drive unit is associated with the two glide doors, wherein the two glide doors comprise a shaft glide door and a prop glide door, and a shaft run door attached to the shaft tube case, wherein the shaft glide door, the prop glide door and the shaft run door are programmed to work independently of each other to perform opening and closing sequences, wherein the shaft and prop glide doors can be moved by electric linear actuators or servos, wherein said glide doors and the attached run door are pushed down into the shaft and cort nozzle perimeter opening that share the three sided stair step perimeter shape and one sided ramp shape as the glide and run doors, but in corresponding shape to provide a seat so that the servos or actuators can hold down pressure on the glide doors during the surfboard's run and glide modes, wherein the shaft glide door comprises overhead tracks, and rollers while the prop glide door comprises side tracks and rollers that work in sync with the perimeter opening's form, wherein there are two open and close sequences that control the glide doors, the motor and drive train stroking up and down, and are actuated by a micro circuit controller that is contained in a control box along with a speed controller and a signal receiver, wherein said receiver has an antenna that receives signals from one end of a triangle shaped wafer that is flush fit at the nose of the surfboard and which can also double as an LED battery gauge, the motor and the battery contained within the motor battery drive case provides a mass centralization of weight which places the weight bias between the surfer's feet just aft of the widest part of the surfboard, wherein the three separate cabins make up a single motor battery drive case that contains the motor and the servo in the dry cabin, and two thirds of the retractable drive unit with two glide doors, two actuators or servos and at least a single one way water vent, in a wet cabin separated by the pleated rubber wall and at least one battery pack and a control box in another cabin, said motor battery drive case is designed for factory installation by surfboard manufacturers wherein a space is cut from shaped foam surfboard blank then the assembled unit is bonded to the center stringer of the blank, also the motor battery drive case could be supplied with the sides uncut and unassembled to the deck and base, providing the builder with a custom option to accommodate different finish thicknesses of the surfboard body, wherein the stepped edges embodied in the motor battery drive case's base and deck make bonding the sides to the base and deck easier to perform, also a set of screw on/off access covers having a deck access design that embodies a thin profile while being strong and waterproof, the surfboard's top surface includes a crowned deck which provides at least a four inch board thickness at a prone and standing area between two and a half inch thick rails, which allows space for components inside the surfboard and extra flotation without sacrificing thin rail sensitivity and turning performance; at least one manual control comprises an elongated clicker button that is placed in a hand landing area on the surfboard's deck that the surfer uses to push up with his arms to go from a prone to a standing position that at the same time is able to shut off the motor and close the glide doors for wave riding; a hand control glove is provided that has a three speed button set and a thumb to mid forefinger actuated on/off clicker button wherein the glove has a one piece construction that holds the control buttons and components on top of the hand to prevent accidental bumping; a pair of hip control board shorts or hip control wetsuit is provided that has an on/off clicker button on one hip and a two speed clicker button on the other hip wherein the hip button placement is out of the way from unwanted bumping and allows quick access; a shoulder control wetsuit is provided that gives the surfer the option to pat the shoulders instead of the hip and also provides out of the way quick access; a wetsuit helmet control is provided that further extends the control options to pat one side of the head to click on/off or the other side for two speeds; a hand recovery glove is also provided that has a GPS map screen and that sends out a homing beacon that has the ability to track and return a lost surfboard after a wipe out, wherein all buttons and controls are placed on top of the hand and out of the way from unwanted bumping, and is configured to work by optional circuitry built into the control box that steers a rudder that doubles as a center fin that moves by way of a servo on an overhead stand that connects to a rudder post, wherein the fins have a turnable center fin that is configured to assist steering under power with a rider on board, wherein an onboard sensor located in the dry battery cabin turns the motor off, retracts the drive unit and closes the glide doors once the rider leaves the deck of the surfboard by a wipeout while surfing.

* * * * *